US012241729B2

(12) United States Patent
Sanchez et al.

(10) Patent No.: US 12,241,729 B2
(45) Date of Patent: Mar. 4, 2025

(54) AUTOMATED SYSTEMS AND APPARATUSES FOR STORING, TRANSPORTING, DISPENSING, AND TRACKING WIRELESS INITIATION DEVICE COMPONENTS CONFIGURABLE FOR INITIATING EXPLOSIVE MATERIAL COMPOSITIONS

(71) Applicant: Orica International Pte Ltd, Singapore (SG)

(72) Inventors: Francisco Sanchez, Aurora, CO (US); Chad Chaffin, Aurora, CO (US)

(73) Assignee: Orica International Pte Ltd, Singapore (SG)

(*) Notice: Subject to any disclaimer, the term of this patent is extended or adjusted under 35 U.S.C. 154(b) by 58 days.

(21) Appl. No.: 17/771,332

(22) PCT Filed: Oct. 23, 2020

(86) PCT No.: PCT/SG2020/050608
§ 371 (c)(1),
(2) Date: Apr. 22, 2022

(87) PCT Pub. No.: WO2021/080513
PCT Pub. Date: Apr. 29, 2021

(65) Prior Publication Data
US 2022/0349692 A1 Nov. 3, 2022

Related U.S. Application Data

(60) Provisional application No. 62/924,719, filed on Oct. 23, 2019.

(51) Int. Cl.
*F42B 39/30* (2006.01)
*B65G 1/04* (2006.01)
(Continued)

(52) U.S. Cl.
CPC .............. *F42B 39/30* (2013.01); *B65G 1/045* (2013.01); *B65G 1/06* (2013.01); *F42B 3/10* (2013.01);
(Continued)

(58) Field of Classification Search
CPC ............ F42B 39/30; F42B 3/10; F42B 35/00; B65G 1/045; B65G 1/06; F42D 1/10; F42D 1/22; G06K 7/10297; G06K 19/0723
(Continued)

(56) References Cited

U.S. PATENT DOCUMENTS 1,599,078 A * 9/1926 Corrie ..................... F42B 3/195
102/275.9
2,773,410 A * 12/1956 Bishop .................... F42B 3/198
29/520
(Continued)

FOREIGN PATENT DOCUMENTS

EP          0690285 A1   1/1996
WO    WO-2003042626 A1   5/2003
(Continued)

*Primary Examiner* — Samir Abdosh

(57) ABSTRACT

Disclosed is a system that includes a magazine. The magazine is configured for holding and dispensing initiation devices or initiation device components having respective non-contact readable identification (ID) codes. The magazine includes one or more initiation device tracking unit(s) configured for reading the non-contact codes of the initiation devices or initiation device components for tracking the initiation devices or the initiation device components.

22 Claims, 18 Drawing Sheets

(51) Int. Cl.
  *B65G 1/06* (2006.01)
  *F42B 3/10* (2006.01)
  *F42B 35/00* (2006.01)
  *F42D 1/10* (2006.01)
  *F42D 1/22* (2006.01)
  *G06K 7/10* (2006.01)
  *G06K 19/07* (2006.01)

(52) U.S. Cl.
  CPC ............... *F42B 35/00* (2013.01); *F42D 1/10* (2013.01); *F42D 1/22* (2013.01); *G06K 7/10297* (2013.01); *G06K 19/0723* (2013.01)

(58) Field of Classification Search
  USPC ........................................................ 102/214
  See application file for complete search history.

(56) References Cited

U.S. PATENT DOCUMENTS

| | | | | |
|---|---|---|---|---|
| 2,999,460 A * | 9/1961 | Stinger | .................. | F42B 3/195 102/202.13 |
| 3,334,403 A * | 8/1967 | Satoshi | .................. | F42B 3/198 29/761 |
| 3,376,785 A * | 4/1968 | Elwin | .................. | F41A 9/05 89/46 |
| 3,931,763 A * | 1/1976 | Bluhm | .................. | F42B 3/26 102/318 |
| 4,138,923 A * | 2/1979 | Brosseau | .................. | F41A 9/73 89/33.02 |
| 4,926,742 A * | 5/1990 | Ma | .................. | F41A 9/75 89/33.02 |
| 8,117,956 B2 * | 2/2012 | Emde | .................. | F41A 9/75 89/33.17 |
| 8,485,083 B1 * | 7/2013 | Care | .................. | F41A 9/75 89/33.02 |
| 9,207,055 B2 * | 12/2015 | Halander | .................. | F42D 3/04 |
| 9,664,470 B2 * | 5/2017 | No | .................. | F41A 9/75 |
| 10,113,843 B2 * | 10/2018 | Appleby | .................. | F42B 3/11 |
| 11,473,892 B2 * | 10/2022 | Santos | .................. | F42D 3/04 |
| 2005/0131655 A1 * | 6/2005 | Moolman | .................. | F42D 1/04 702/187 |
| 2013/0098257 A1 * | 4/2013 | Goodridge | .................. | F42B 3/113 102/201 |
| 2016/0231074 A1 * | 8/2016 | Mcdaniel | .................. | F41A 9/37 |
| 2017/0356292 A1 * | 12/2017 | Wang | .................. | E21B 7/025 |
| 2018/0106584 A1 * | 4/2018 | Santos | .................. | F42D 1/10 |
| 2018/0231361 A1 * | 8/2018 | Wicks | .................. | F42D 1/055 |
| 2022/0412713 A1 * | 12/2022 | Sanchez | .................. | F42D 1/045 |

FOREIGN PATENT DOCUMENTS

| | | |
|---|---|---|
| WO | WO-2006128257 A1 | 12/2006 |
| WO | WO-2012149277 A2 | 11/2012 |
| WO | WO-2017041830 A1 | 3/2017 |
| WO | WO-2020000057 A1 | 1/2020 |
| WO | WO-2021080513 A1 | 4/2021 |
| WO | WO-2021080514 A1 | 4/2021 |

* cited by examiner

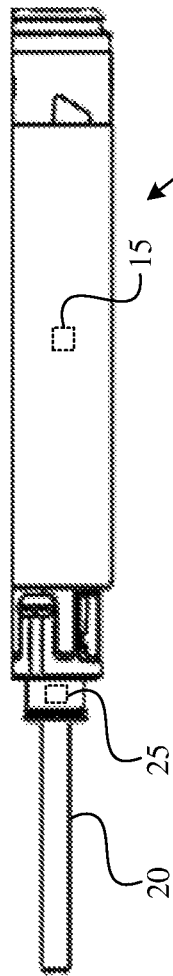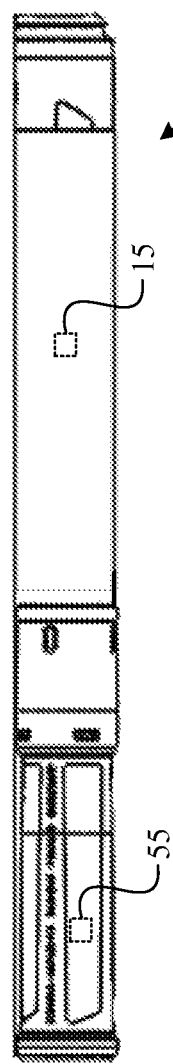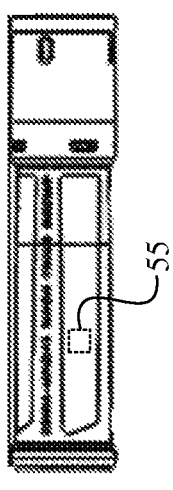
FIG. 1A
FIG. 1B
FIG. 1C

FIG. 3G SECTION A-A

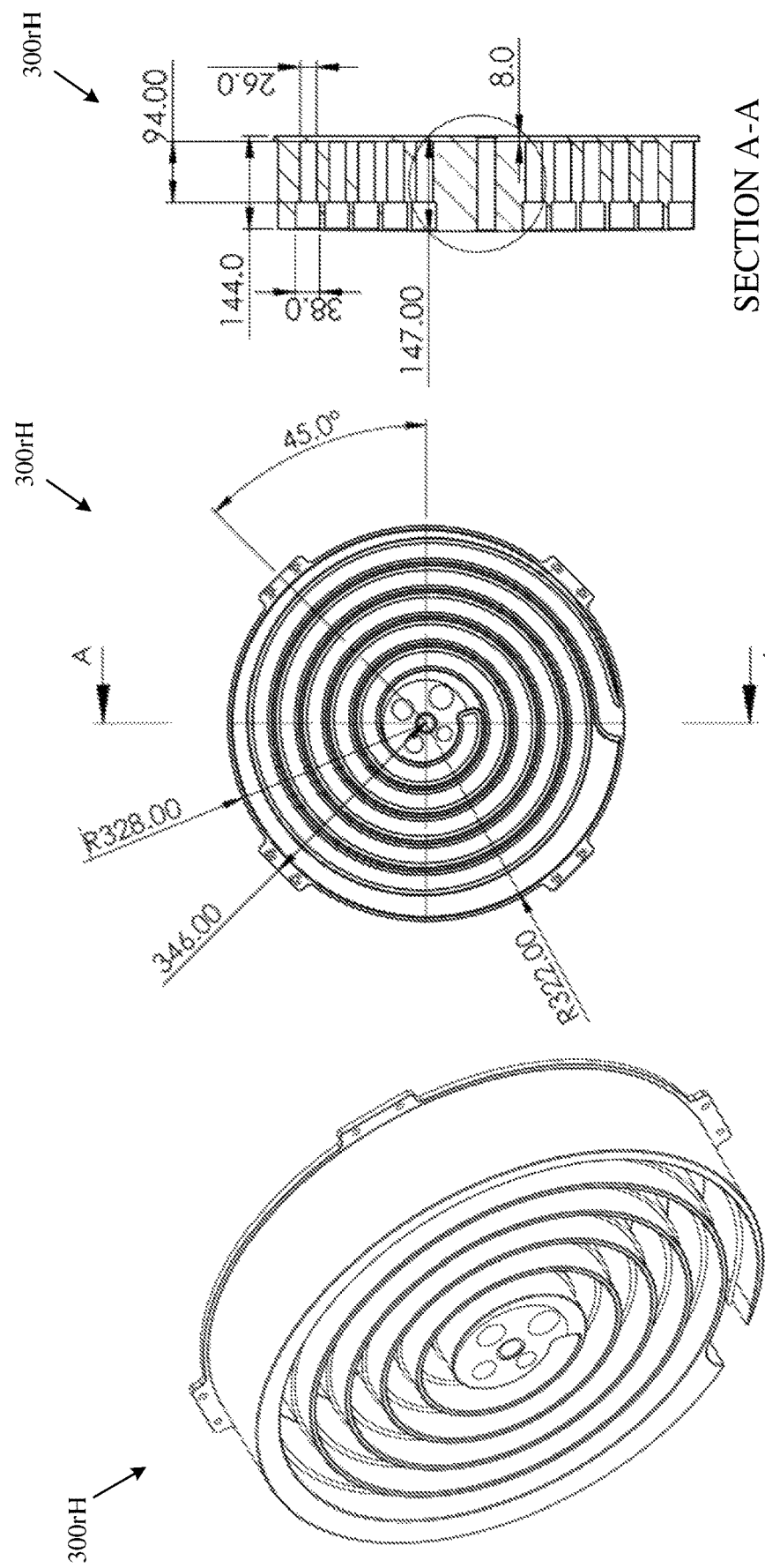

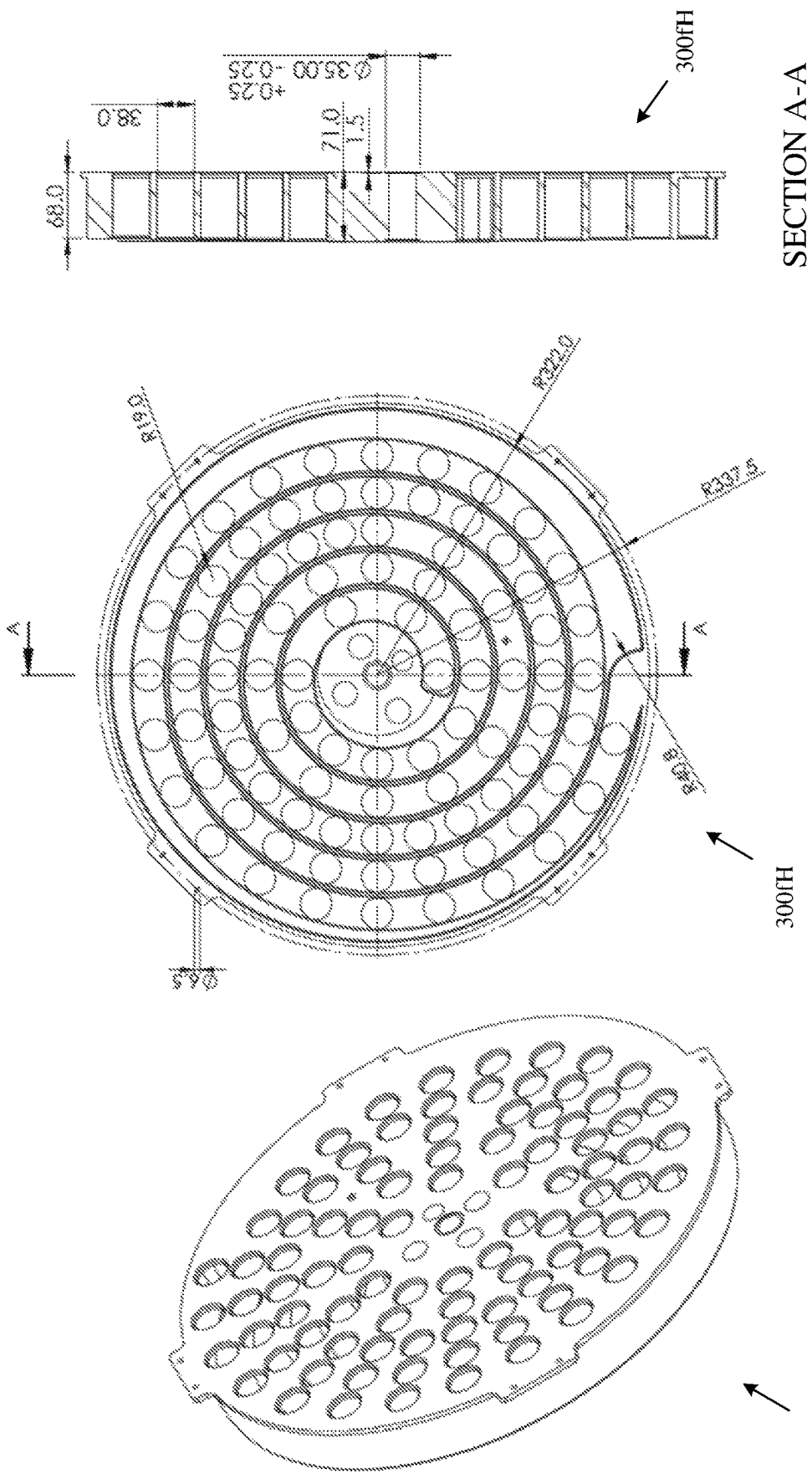

FIG. 3S SECTION A-A

AUTOMATED SYSTEMS AND APPARATUSES FOR STORING, TRANSPORTING, DISPENSING, AND TRACKING WIRELESS INITIATION DEVICE COMPONENTS CONFIGURABLE FOR INITIATING EXPLOSIVE MATERIAL COMPOSITIONS

CROSS-REFERENCE TO RELATED APPLICATIONS

This application is a U.S. national phase application of International Patent Application No. PCT/SG2020/050608, filed Oct. 23, 2020, which claims the benefit of priority to U.S. Provisional Application No. 62/924,719, filed Oct. 23, 2019, the contents of each of which are hereby incorporated herein by reference in their entirety.

TECHNICAL FIELD

Aspects of the present disclosure relate to a system including a set of mechanized, mechanizable, automated, or automatable apparatuses configured for holding, storing, carrying, transporting, and dispensing, which enable automated or automatic tracking of initiation device components corresponding to initiation devices (wired and/or wireless) that are configurable or configured for initiating explosive material compositions, such as explosives material compositions loaded into boreholes in association with commercial blasting operations.

BACKGROUND

Conventional magazine apparatuses used for carrying explosive initiation device components may be poorly suited for handling and dispensing explosive initiation device components or explosive initiation devices, e.g., in semi-automated, automated, or autonomous explosive loading systems.

Moreover, conventional magazine apparatuses and associated systems may be inadequate with respect to facilitating determination of whether particular explosive initiation device components or explosive initiation devices have been or are being properly and safely stored and dispensed in-field.

It is desired to address or ameliorate one or more disadvantages or limitations associated with the prior art, or to at least provide a useful alternative.

SUMMARY

Disclosed herein is a system including:
a magazine (e.g., 100,101,100X) configured for holding and dispensing initiation devices (e.g., 81) or initiation device components (e.g., 10,20,50) having respective non-contact readable identification (ID) codes,
wherein the magazine includes one or more initiation device tracking unit(s) configured for reading the non-contact codes of the initiation devices or initiation device components for tracking the initiation devices or the initiation device components.

The system may include a data communication unit coupled to the non-contact scanner/reader devices by which IDs read by the non-contact scanner/reader devices can be communicated to an external or remote destination, network/network address, computer system, or electronic/computing device (remote server system) that is separate or distinct from the magazine.

The initiation device components may each include an initiation device head unit that carries a head unit ID code (e.g., head unit optical code or head unit RFID tag), an initiation element that carries an initiation element ID code (e.g., initiation element optical code or initiation element RFID tag), and an initiation device booster unit that carries a booster unit ID code (e.g., booster unit optical code or booster unit RFID tag); and the initiation devices may comprise one-piece primer units that each carry a primer unit ID code (e.g., primer unit optical code or primer unit RFID tag).

The initiation device tracking unit(s) may be configured for reading the non-contact codes of one or more of the initiation device components for tracking, e.g., the initiation device head unit, the initiation element, and/or initiation device booster unit.

The system may be configured to generate an alert if the initiation device tracking unit(s) read a non-contact code that is not recoded as being ready for dispensing.

The non-contact readable identification (ID) codes may uniquely identify the components (the respective head unit, initiation element, booster unit and one-piece primer unit, e.g., by including a serial number allocated during manufacture of the components).

The non-contact readable identification (ID) codes may be in the form of RFID tags, and the initiation device tracking unit(s) may include RFID scanner/reader devices.

At least one of the initiation device components may be wireless initiation device components, or the initiation devices may be wireless initiation devices.

The system may include one or more antennas configured to wirelessly communicate commands to the initiation devices or initiation device components stored in the magazine.

The one or more antennas may include an antenna remote from the magazine or an antenna be disposed adjacent to or carried by the magazine.

Disclosed herein is a method including:
holding initiation devices or initiation device components having respective non-contact readable identification (ID) codes (e.g., RFID tags) in a magazine;
dispensing the initiation devices or initiation device components from the magazine; and
reading the non-contact readable identification (ID) codes (e.g., RFID tags) while the initiation devices or initiation device components are stored in and/or being dispensed from the magazine.

Disclosed herein is an apparatus including:
a magazine configured for holding, carrying and dispensing structurally complete, unified initiation devices (e.g., 80,81) for loading into a borehole,
wherein the magazine includes at least one carrier (e.g., 110) for carrying the unified initiation devices and for guiding the unified initiation devices during dispensing, wherein the carrier includes at least one slot, wherein the slot is configured to carry the unified initiation devices across a first portion of each unified initiation device's length,
wherein the first magazine includes one or more spiral guide structures (e.g., 300) for carrying the unified initiation devices across a second portion of each unified initiation device's length and for guiding the unified initiation devices during the dispensing.

The at least one slot may include an inner or bottom surface closer to a centroid or center point of the carrier, and each slot may include an exit opening at outer edges of the carriers.

The spiral guide structures may be disposed relative to the carrier for establishing or providing spiral travel channels/paths for the unified initiation devices held by the slots, and the spiral travel channels/paths may be configured for carrying the initiation devices such that rotation of the carrier relative to the spiral guide structures in a dispensing direction displaces the unified initiation devices along the spiral travel channels/paths and along the slots toward an outlet of the magazine.

The apparatus may include a lid structure for opening to allow loading of the initiation devices into the magazine.

The apparatus may include a case structure for at least partially encasing the carrier and the spiral guide structures, optionally including an explosives box enclosure for enclosing the first case structure.

The apparatus may include a drive shaft for driving the magazine to dispense the initiation devices.

The apparatus may including a plurality of the initiation devices in the magazine.

The apparatus may include an antenna configured to wirelessly communicate commands to the initiation devices carried by the magazine.

Disclosed herein is a vehicle including the apparatus above securely mountable or mounted to the vehicle for transport to a location near or at the borehole (e.g., 5a).

Disclosed herein is a method including:
holding a plurality of unified initiation devices in a magazine;
displacing the plurality of unified initiation devices along spiral travel channels/paths and along slots of the magazine toward an outlet of the magazine; and
dispensing from the magazine one of the plurality of unified initiation devices,
and optionally loading the unified initiation device into a borehole.

The system, apparatus and method are for holding, storing, carrying, transporting, dispensing, and automatically tracking initiation devices and initiation device components corresponding to initiation devices that are configurable or configured for initiating explosive material compositions, such as explosives material compositions loaded into boreholes in association with commercial blasting operations. The system includes a set of mechanized, mechanizable, automated, or automatable apparatuses configured for holding, storing, carrying, transporting, and dispensing, which enable automated or automatic tracking of wireless initiation device components corresponding to wireless initiation devices that are configurable or configured for initiating explosive material compositions, such as explosives material compositions loaded into boreholes in association with commercial blasting operations.

BRIEF DESCRIPTION OF THE DRAWINGS

Some embodiments of the present invention are hereinafter described, by way of non-limiting example only, with reference to the accompanying drawings, in which:

FIGS. 1A-1C illustrate particular aspects of initiation device components that facilitate initiation device component tracking;

DETAILED DESCRIPTION

Figure 2:
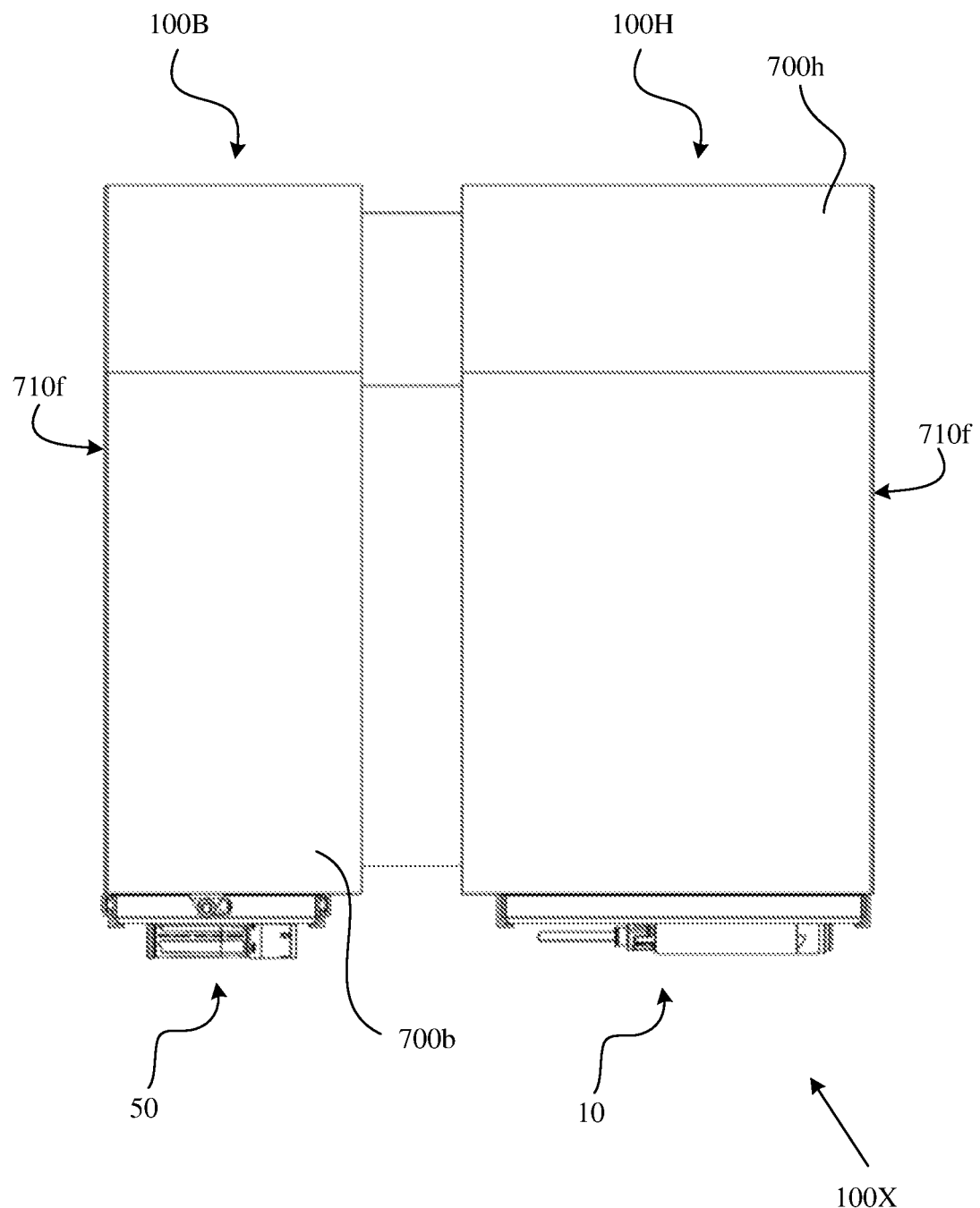
FIGS. 2 and 3A-3S illustrate particular aspects of a first magazine apparatus or magazine in accordance with certain embodiments of the present disclosure (dimensions in millimeters, mm)

In this specification, unless the context stipulates or requires otherwise, any use of the word "comprise," and variations thereof such as "comprises" or "comprising," imply the inclusion of a stated element or operation or group of elements or operations, but not the exclusion of any other element or operation or group of elements or operations.

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavor to which this specification relates.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in An Introduction to Mathematical Reasoning: Numbers, Sets, and Functions, "Chapter 11: Properties of Finite Sets" (e.g., as indicated on p. 140), by Peter J. Eccles, Cambridge University Press (1998)). Thus, a set includes at least one element. In general, an element of a set can include or be one or more portions of a system, an apparatus, a device, a structure, an object, a process, a physical parameter, or a value depending upon the type of set under consideration.

Herein, reference to one or more embodiments, e.g., as embodiments, various embodiments, many embodiments, several embodiments, multiple embodiments, some embodiments, certain embodiments, particular embodiments, specific embodiments, or a number of embodiments, need not or does not mean or imply all embodiments.

The FIGs. included herewith show aspects of non-limiting representative embodiments in accordance with the present disclosure, and particular elements shown in the FIGs. may be representative in nature, in that they are not shown to scale or precisely to scale relative to each other, and/or can be implemented in different or multiple manners. The depiction of a given element or consideration or use of a particular element number in a particular FIG. or a reference thereto in corresponding descriptive material can encompass the same, an equivalent, an analogous, categorically analogous, or similar element or element number identified in another FIG. or descriptive material associated therewith. The presence of "I" in a FIG. or text herein is understood to mean "and/or" unless otherwise indicated. The recitation of a particular numerical value or value range herein is understood to include or be a recitation of an approximate numerical value or value range, for instance, within +/−20%, +/−15%, +/−10%, +/−5%, +/−2.5%, +/−2%, +/−1%, +/−0.5%, or +/−0%. The term "essentially" or "essentially all" can indicate a percentage, or within a percentage, greater than or equal to 90%, for instance, 92.5%, 95%, 97.5%, 99%, or 100%.

Overview

Embodiments in accordance with the present disclosure are directed to a system including at least one apparatus by which initiation devices (including wireless initiation devices, partially/partly wireless or partially/partly wired initiation devices and wired initiation devices) that are configurable or configured for initiating explosive material compositions (e.g., tertiary explosive material compositions such as ammonium nitrate (AN) based emulsion explosives and/or other types of bulk tertiary explosive material compositions) employed in commercial blasting operations can be stored or transported; output, released, dispensed, or ejected; and automatically or semi-automatically tracked, e.g., in association with borehole loading procedures or operations in which boreholes drilled in a geological formation are loaded with one or more types of explosive material compositions as well as initiation devices configurable or configured for initiating such explosive material compositions.

An apparatus configured for storing or transporting and outputting, releasing, dispensing, or ejecting, and enabling the automatic or semi-automatic tracking of initiation devices carried thereby in accordance with particular embodiments of the present disclosure can be referred to herein as a (wireless or wired) initiation device magazine apparatus, a (wireless or wired) initiation device magazine, or simply a magazine.

A wireless initiation device can communicate by way of low frequency or very low frequency signals that can propagate through the earth (TTE) over distances to a blast control system (or blasting machine) that enable one or more types of commercial blasting operations (e.g., surface/open cut mining blasting operations, and/or underground mining blasting operations). A partially/partly wireless or partially/partly wired initiation device can include a top box or collar component that is connected by one or more wires to the down-hole component that includes the detonator/initiation element and primer explosive, and the top box can be configured to communicate by way of RF frequency communications, e.g., according to standard protocols, using RF signals that propagate through the air to the blasting machine for similar commercial blasting operations. For purpose of brevity and clarity, partially/partly wireless or partially/partly wired initiation devices are encompassed herein by the terms wireless initiation devices or wired initiation devices. A wired initiation device can communicate by way of one or more wires, e.g., a harness, over distances to the blasting machine that enable one or more types of commercial blasting operations (e.g., surface/open cut mining blasting operations, and/or underground mining blasting operations).

In some, though not all embodiments, an initiation device includes at least two components, namely, a first or head unit, which includes a communication/control unit (which itself is configured respectively for wireless or wire-based/wired communications with a blasting operation system) that is coupled or couplable to an initiation element or device (e.g., a detonator or light source for ignition); and a second or booster unit, which carries an explosive booster charge that the initiation device is configured to initiate. In some wired initiation devices, the head unit may be referred to as a "detonator assembly". Depending upon embodiment details, in both wireless initiation devices and wired initiation devices, the initiation element can be coupled to or included in either the head unit or the booster unit, e.g., affixed to or incorporated in the respective unit forming one piece (e.g., a combined piece, relative to that head or booster unit) for (in-field) storage, assembly, and use. Once a head unit and a booster unit are coupled or securely assembled or joined together they form a structurally complete or unified initiation device, e.g., which can be defined as a (wireless or wired) explosive primer unit, a (wireless or wired) primer unit, a (wireless or wired) explosive primer, or a (wireless or wired) primer. In association with an encoding process, an assembled initiation device becomes fully functional/operational, and is loadable into a borehole along with one or more explosives materials, after which the initiation device can initiate and/or detonate the explosives material(s) in the borehole. A representative example of such a wireless initiation device configured for MI based communication is a WebGen® initiation device available from Orica International Pte Ltd, Singapore, as described in U.S. Patent Publication No. 20180231361, entitled "Wireless Initiation Device," published on 16 Aug. 2018.

In other embodiments, prior to its loading or insertion into a magazine apparatus in accordance with an embodiment of the present disclosure, a wired or wireless initiation device already exists in the form of a pre-assembled, unitary, or single piece/one piece structure, e.g., which requires no further assembly, such as a wired or wireless initiation device configured as a one-piece primer and which includes the light source for explosive ignition or initiation, i.e., an optical, e.g., laser based or light emitting diode (LED) based, explosive initiation device or element, such as described in U.S. Patent Publication No. 20130098257, entitled "Method of Blasting," published on 25 Apr. 2013; and/or U.S. Pat. No. 10,113,843, entitled "Apparatus, System, and Method for Initiation of Buried Explosives," granted on 30 Oct. 2018.

In view of the foregoing, a properly encoded/fully functional (wireless or wired) initiation device can (wirelessly or via wires) receive instructions/commands from the remotely located blast control equipment, e.g., the blast control system, and process and selectively execute such instructions/commands in association with facilitating or enabling a commercial blasting operation. The blast control system can communicate with the wireless and wired initiation devices to send blasting commands, e.g., command signals selected from the group consisting of: ARM signals, DISARM signals, FIRE signals, delay times, and firing codes. In response to a specific instruction/command or instruction/command sequence (e.g., a FIRE command, or a FIRE command in association with a prior command that established a delay time), a set of initiation devices can be activated to explosively initiate one or more types of explosive material compositions surrounding or proximate or adjacent to the initiation device(s).

Additional Aspects of Initiation Device Components

Initiation device components, e.g., wired or wireless initiation device head units and/or wired or wireless initiation device booster units, or wired or wireless primer units, carry or include non-contact readable identification (ID) codes, including: electronically scannable/readable elements/circuitry therein and/or thereon, such as radio frequency identification (RFID) tags; and/or optically scannable/readable elements (optical tags) thereon, such as one-dimensional (1D) codes (barcodes) or two-dimensional (2D) codes (QR codes). The non-contact readable identification (ID) codes can be read or scanned without directly physically contacting the initiation device components, allowing them to be read with less precision than would be required to position contact electrodes, etc. The non-contact readable identification (ID) codes uniquely identify the components (the respective head unit 10, initiation element 20, booster unit 50 and one-piece primer unit 81), e.g., a serial number allocated during manufacture of the components.

FIG. 1A is a schematic illustration of an initiation device head unit 10 and an initiation device booster unit 50 that carry a head unit RFID tag 15 and a booster unit RFID tag 55, respectively. Each head unit RFID tag 15 stores an electronically readable code that uniquely identifies the initiation device head unit 10; and each booster unit RFID tag 55 stores an electronically readable code that uniquely identifies the initiation device booster unit 50, in a manner understood by individuals having ordinary skill in the relevant art. Depending upon embodiment details, the head unit RFID tag 15 can be disposed internal to the head unit 10, or in or on the surface of a housing of the head unit 10. Similarly, the booster unit RFID tag 55 can be disposed internal to the booster unit 50, or in or on the surface of a housing of the booster unit 50. As indicated in FIG. 1A, an initiation element 20, e.g., a detonator or light source for ignition, is associated with or couplable/coupled to the head unit 10, in a manner also understood by individuals having ordinary skill in the relevant art. The initiation element 20 can carry an initiation element/detonator RFID tag 25, which stores an electronically readable code that uniquely identifies the initiation element 20. FIG. 1B illustrates an assembled initiation device 80 (e.g., which is configurable or configured for wireless communication), in which the head unit 10 and the booster unit 50 thereof have been securely assembled, joined, or connected together, such that the initiation element 20 is also coupled to or resides in the booster unit 50 in a manner that can enable explosive initiation of one or more types of explosive material compositions within the booster unit 50 by way of the initiation element 20, under the control of the head unit 10.

FIG. 1C is a schematic illustration of a one-piece initiation device such as a one-piece primer unit 81 that carries a primer unit RFID tag 85, which stores an electronically readable code that uniquely identifies the primer unit 85, and which can reside internal to the primer unit 85, or in or on the surface of a housing of the primer unit 85.

Such RFID tags 15, 25, 55, 85 facilitate initiation device component tracking processes, procedures, or operations by systems, apparatuses, and/or devices in accordance with embodiments of the present disclosure.

Instead of, or in addition to, the RFID tags 15, 25, 55, 85, the respective head unit 10, initiation element 20, booster unit 50 and one-piece primer unit 81 can include or carry the optically scannable/readable elements (optical tags). The optical tags include and represent the same or analogous types of readable codes that uniquely identify the components (the respective head unit 10, initiation element 20, booster unit 50 and one-piece primer unit 81).

General Aspects of a Magazine Apparatus

A wireless or wired initiation device magazine apparatus, which for purpose of simplicity and clarity can be referred to herein as a magazine apparatus or magazine, in accordance with embodiments of present disclosure is movable, portable, or transportable/trammable, e.g., typically securely mountable or mounted to a piece of equipment or a vehicle that supports or performs borehole loading procedures, and transportable/trammable by the equipment or vehicle to a location near or at which borehole loading with explosive material compositions and initiation devices is intended to occur. As disclosed herein, it can be beneficial to (a) reduce or minimize (i) the number of moving parts in a magazine apparatus in order to reduce structural complexity, reduce cost, and enhance mechanical reliability or the magazine apparatus, and/or (ii) the mass of the magazine apparatus in order to aid the transportability thereof, while also maintaining an intended, practical, or adequate (b) level of structural integrity of the magazine apparatus as well as (c) total initiation device carrying capacity within the magazine apparatus. Initiation device magazine apparatuses in accordance with the present disclosure may provide or realize at least some of such benefits.

In several embodiments, a magazine apparatus configured for carrying and dispensing initiation components or devices includes or resides in an enclosure that is constructed in a manner that meets regional or national requirements set forth by one or more countries for explosives day boxes and/or carry boxes. Thus, an initiation device magazine apparatus in accordance with an embodiment of the present disclosure can also be referred to or defined as or reside within a wired or wireless initiation device day box and/or carry box.

Aspects of a First Magazine Apparatus

A first magazine apparatus in accordance with embodiments of the present disclosure is configured for carrying, transporting, and assembling initiation device head units 10 and booster units 50, and facilitating the tracking of such initiation device components.

A first initiation device assembly apparatus in accordance with embodiments of the present disclosure can receive a head unit and a corresponding booster unit from an initiation device magazine apparatus, and automatically assemble or securely join the head unit and the booster unit to form a structurally complete or unified initiation device, e.g., which has a structure shown and described in U.S. Patent Publication No. 20180231361. For purpose of simplicity and clarity, an initiation device assembly apparatus can be referred to herein as an assembly apparatus, assembly unit, or assembler.

FIG. 2 is a schematic illustration of a first (wireless or wired) initiation device magazine apparatus (or "dual magazine") 100X configured for carrying/holding and dispensing initiation devices 80 in accordance with an embodiment of the present disclosure. In an embodiment, the first magazine apparatus 100 includes a first apparatus that can be defined as an initiation device head unit magazine apparatus or magazine 100H; and a second apparatus, which can be defined as an initiation device booster unit magazine apparatus or magazine 100B. The head unit magazine 100H is configured for holding/carrying and dispensing initiation device head units 10; and the booster unit magazine 100B is configured for holding/carrying and dispensing initiation device booster units 50, such that a given initiation device head unit 10 output or dispensed by the magazine apparatus 100H and a given initiation device booster unit 50 output or dispensed by the magazine apparatus 100B can be assembled together by way of an assembly apparatus, such as detailed below, to form a given structurally complete or unified initiation device 80, which can be a wireless initiation device.

In various embodiments, an initiation device head unit 10 has an overall or maximum length, and an overall or maximum cross sectional area or diameter; an initiation device booster unit 50 has an overall or maximum length, and an overall or maximum cross sectional area or diameter; and when assembled an initiation device 80 has an overall or maximum length, and an overall or maximum cross sectional area or diameter. A portion of the initiation device head unit 10, e.g., the initiation element 20 thereof, can be insertable into a passage of the initiation device booster unit 50 when the initiation device 80 is assembled, in a manner understood by individuals having ordinary skill in the relevant art. Alternatively, a portion of the initiation device booster unit 50, e.g., the initiation element 20 thereof, can be insertable into a passage of the initiation device head unit 10 when the initiation device 80 is assembled.

In various portions of the text herein and particular FIGs. included herewith, a suffix "h" of "H" applied or appended to a given element reference number indicates an element of the head unit magazine 100H; and a suffix "b" or "B" applied or appended to this element reference number indicates a corresponding or counterpart element of the booster unit magazine 100B. Notwithstanding, in various embodiments, the head unit magazine 100H and the booster unit magazine 100B each internally include or internally consist essentially of essentially the same or the same types and/or numbers of structural elements, but the shape(s), size(s), and/or dimension(s) of particular structural elements typically differs between the head unit magazine 100H and the booster unit magazine 100B because of mass, shape, size, and/or dimensional differences between each head unit 10 and each booster unit 50. Hence, portions of the description hereafter are directed to fundamental structural aspects of a magazine apparatus "100" in accordance with multiple embodiments of the present disclosure, which pertain to each of the head unit magazine 100H and the booster unit magazine 100B. Individuals having ordinary skill in the relevant art will understand the manner(s) in which the shape(s), size(s), and/or dimension(s) structural elements of the head unit magazine 100H and the booster unit magazine 100B can be provided, formed, and/or implemented in view of the following description.

Figure 3A:
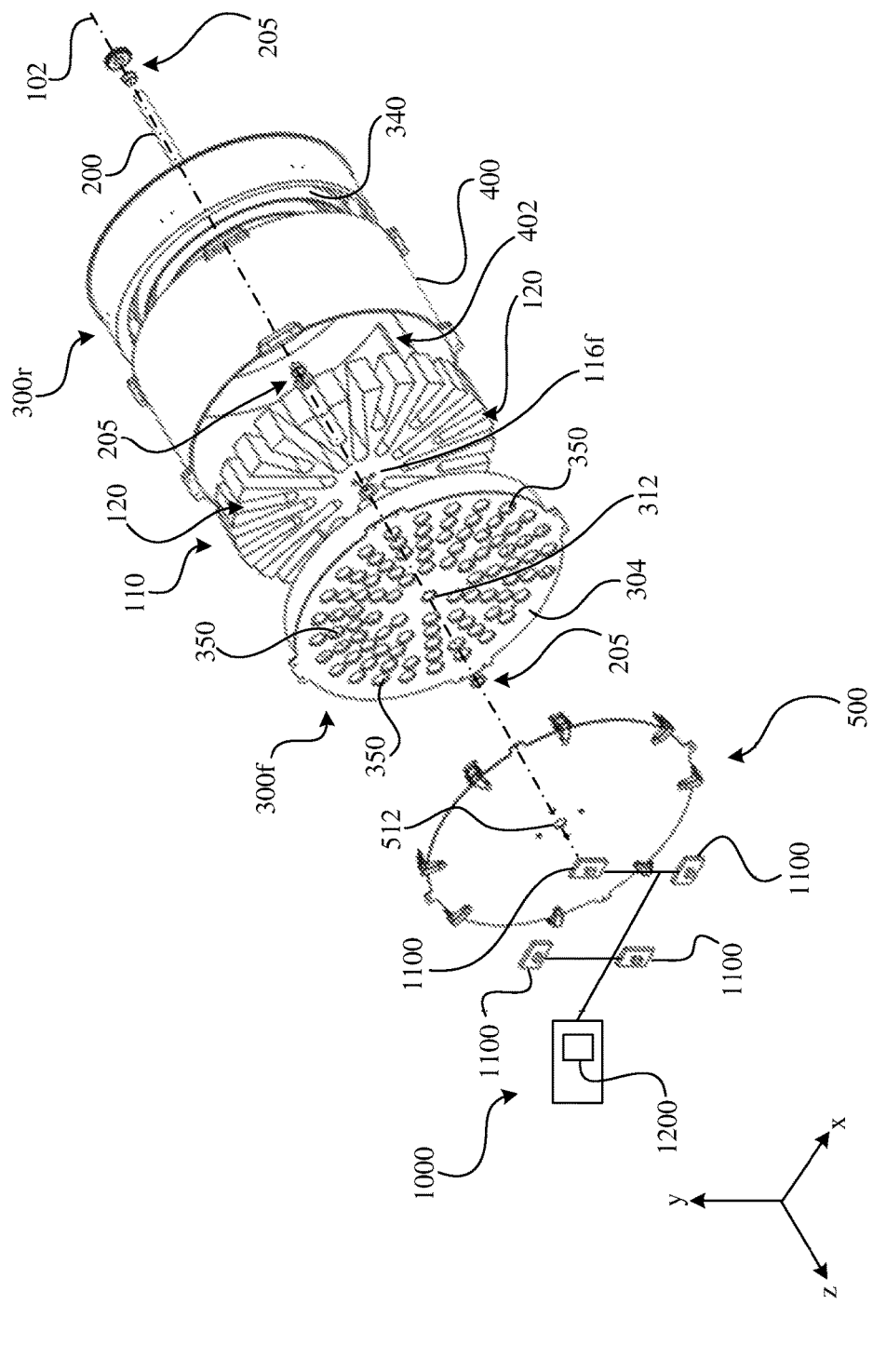
Figure 3B:
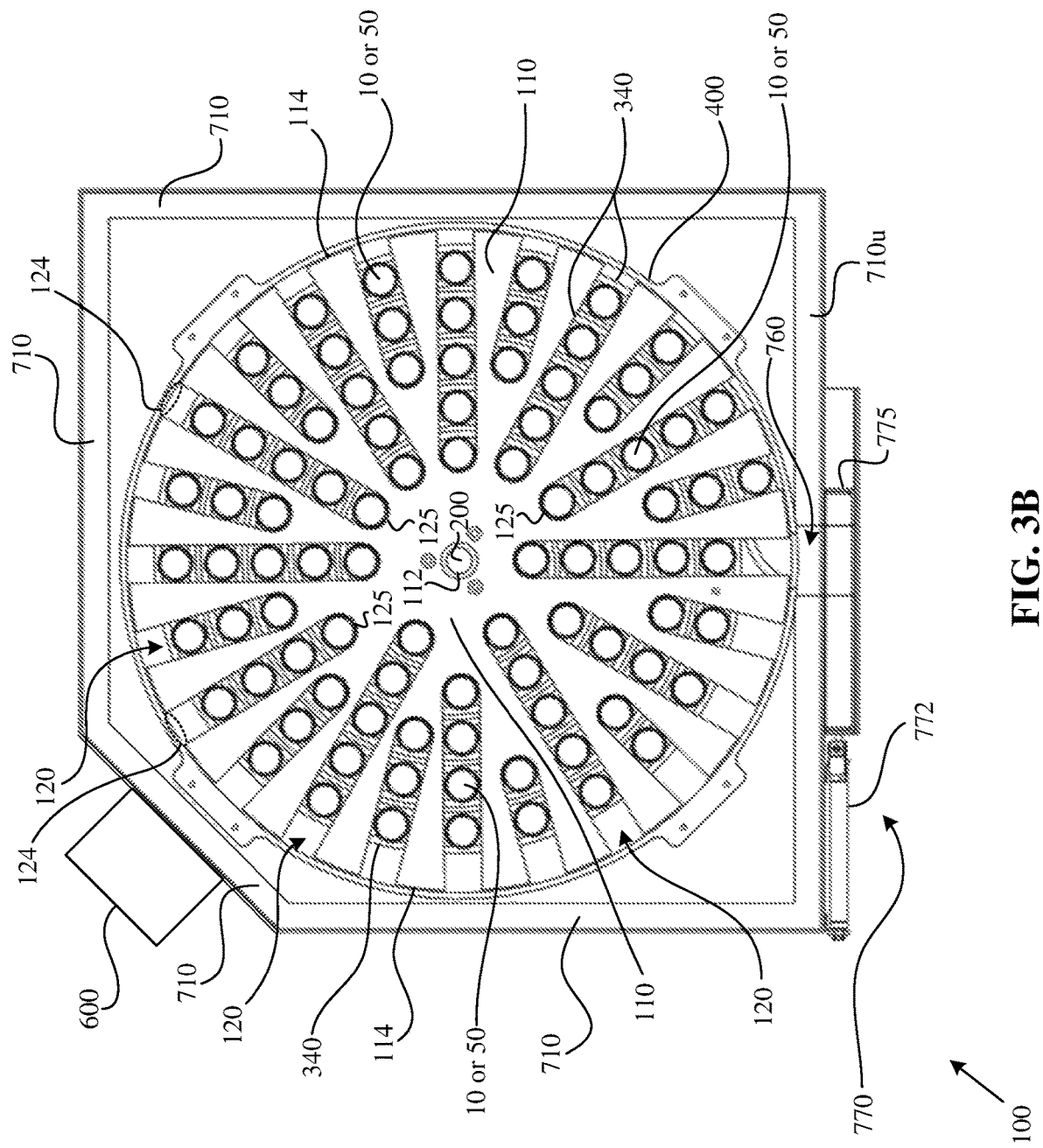

FIG. 3A is an exploded perspective view of a first magazine apparatus or magazine 100 in accordance with several embodiments of the present disclosure. FIG. 3B is a front view of a first magazine assembly or magazine 100 in accordance with multiple embodiments of the present disclosure, which is loaded with initiation device head units 10 or initiation device booster units 50 depending upon whether the first magazine 100 is a head unit magazine 100H or a booster unit magazine 100B, respectively.

The magazine 100 has a central or longitudinal axis 102, relative to which multiple structural elements of the magazine 100 are cooperatively alignable or aligned. The central axis 102 of the magazine 100 can be defined to be parallel to or extend along a spatial z axis corresponding to a coordinate system defined by orthogonal x, y, and z axes, in a manner understood by individuals having ordinary skill in the relevant art.

In multiple embodiments, the magazine 100 includes or internally consists essentially of the following structural elements, e.g., when assembled and/or in use:

1. a carrier 110 for carrying the initiation device components 10,50 and for guiding the initiation device components 10,50 during dispensing;
2. a drive shaft 200 for driving the magazine 100 to carry and dispense the initiation device components 10,50;
3. a set of spiral guide structure(s) 300 for carrying the initiation device components 10,50 and for guiding the initiation device components 10,50 during dispensing in cooperation with the carrier 110;
4. a case structure 400 for at least partially encasing the carrier 110 and the spiral guide structure(s) 300;
5. a removable or detachable lid structure 500 for opening to allow loading of the initiation device components 10,50 into the carrier 110 and spiral guide structure(s) 300;
6. a drive mechanism with a motor 600 for rotating the drive shaft 200;
7. an explosives box enclosure 700 for enclosing the case structure 400 according to explosives day box/carry box requirements; and
8. a set of an initiation device tracking unit(s) configured for reading the ID codes (e.g., RFID tags 15, 25, 55, 85) of the initiation devices 81 and/or components 10,20,50 in the magazines 100,101 to enable automatic or semi-automatic tracking of the wireless initiation devices 81 and/or components 10,20,50.

1. Displaceable/Rotatable Carrier 110

A displaceable/rotatable carrier 110 exhibits a disk-like or cylindrical spatial profile, geometry, or shape, and includes a plurality of elongate recesses, channels, or slots 120 formed therein across its disk-like spatial profile. Each slot 120 has an elongate length (or "depth") across portions of the cross-sectional area of the carrier 110, e.g., from an outer or outward boundary or aperture 124 of the slot 120 corresponding to a portion of an outer edge 114 of the carrier 110, to an inner or bottom surface 125 of the slot 120 closer to a centroid or center point of the carrier 110. Along its depth, each slot 120 is configured for carrying and holding or retaining each of a set of initiation devices 10 across a particular portion of the initiation device's length, wherein the particular portion is a middle portion between longitudinal ends of the initiation device, or wherein the particular portion includes at least one end portion of each wireless initiation device component. As shown in FIGS. 3D and 3F, the slots 120 have includes slots with mutually different depths: e.g., including a first slot depth holding 5 units in the slot 120, a second slot depth holding 4 units in the slot 120, a third slot depth holding 3 units in the slot 120; and a fourth slot depth holding 2 units in the slot 120. The shallower slots are arranged between pairs of the deeper slots as shown in FIGS. 3D and 3F.

The carrier 110 may be described as a "carrier plate" or "carrier wheel" because it has an axial thickness substantially less than its diameter, e.g., like a wagon wheel. This axial thickness is essentially equal to the particular portion of the initiation device's length.

More particularly, in various embodiments the carrier 110 has a generally planar, approximately planar, or planar first, forward, or front exposed surface 116f that is parallel to a first spatial plane, e.g., an x-y plane corresponding to orthogonal x and y spatial axes; and a generally planar, approximately planar, or planar second, rearward, rear, or back exposed surface that is also parallel to the first spatial plane. The carrier 110 has a thickness corresponding to or defined by a distance between its front exposed surface 116*f* and its rear exposed surface 116*r*, e.g., along the spatial z axis. The carrier 110 has a predetermined diameter or span across the cross-sectional area of the front and/or rear exposed surfaces 116*f,r*. The carrier 110 also has a central opening 112 therein, within which the center point of the carrier 110 resides such that the carrier's center point is aligned with the central axis of the magazine 100, parallel to the z axis. The carrier 110 is rotatable, e.g., in a clockwise and/or a counterclockwise direction, about the magazine's central axis 102.

Further with respect to the aforementioned slots 120, each slot 120 has a length or depth that extends in a direction parallel to the first spatial plane and transverse or perpendicular to the magazine's central axis 102. More specifically, the depth of each slot 120 extends along a radial direction with respect to the magazine's central axis 102, from a slot exit opening or aperture 124 corresponding to a particular portion of the outer edge 114 of the carrier 110, to a slot bottom surface 125 located a predetermined distance away from the magazine's central axis 102. Each slot 120 has a thickness that extends across or through the carrier's thickness, e.g., the thickness of each slot 120 corresponds to or equals the thickness of the carrier 110. The axial thickness of the slot 120H,B is sufficient to carry the particular portion, i.e., the middle portion of the end portion. Furthermore, each slot 120 has a width parallel to the first spatial plane, which is slightly larger than an outer cross-sectional area or diameter (e.g., a maximum outer cross-sectional area or diameter) of a portion, section, or segment of an initiation device component, e.g., an initiation device head unit 10 or an initiation device booster unit 50, that the slot 120 is configured for holding. Each slot 120 thus prevents lateral movement(s) or displacement(s) of the initiation device components held by the slot 120 beyond the width of the slot 120.

A given slot 120 is typically configured for carrying and holding or retaining multiple initiation device components along the slot's depth. In various embodiments, the slots 120 do not all have identical depths; that is, some slots 120 have a larger or a smaller depth than other slots 120. In such embodiments, while the exit opening 124 of each of the slots 120 is located essentially the same or the same radial distance away from the magazine's central axis 102, and extends to the outer edge 114 of the carrier 110, the bottom surfaces 125 of some slots 120 are radially closer to the magazine's central axis 102 than the bottom surfaces 125 of other slots 120. Hence, when all slots 120 are fully loaded with initiation device components, some slots 120 can carry and retain or hold more initiation device components than other slots 120. Additionally, the slots 120 need not be or are not all evenly spaced relative to each other about the circumference of the carrier. More particularly, in view of the foregoing the slots 120 can be cut into or formed in the carrier 110 in a manner that maximizes the number of initiation devices 80 that the magazine 100 can carry, while minimizing the overall mass of the carrier 110 and simultaneously ensuring that the carrier 110 remains structurally robust or exhibits sufficient structural integrity, e.g., when the magazine 100 is carrying a full load of initiating devices 80 including while the carrier 110 is undergoing rotational motion.

Figure 3C:
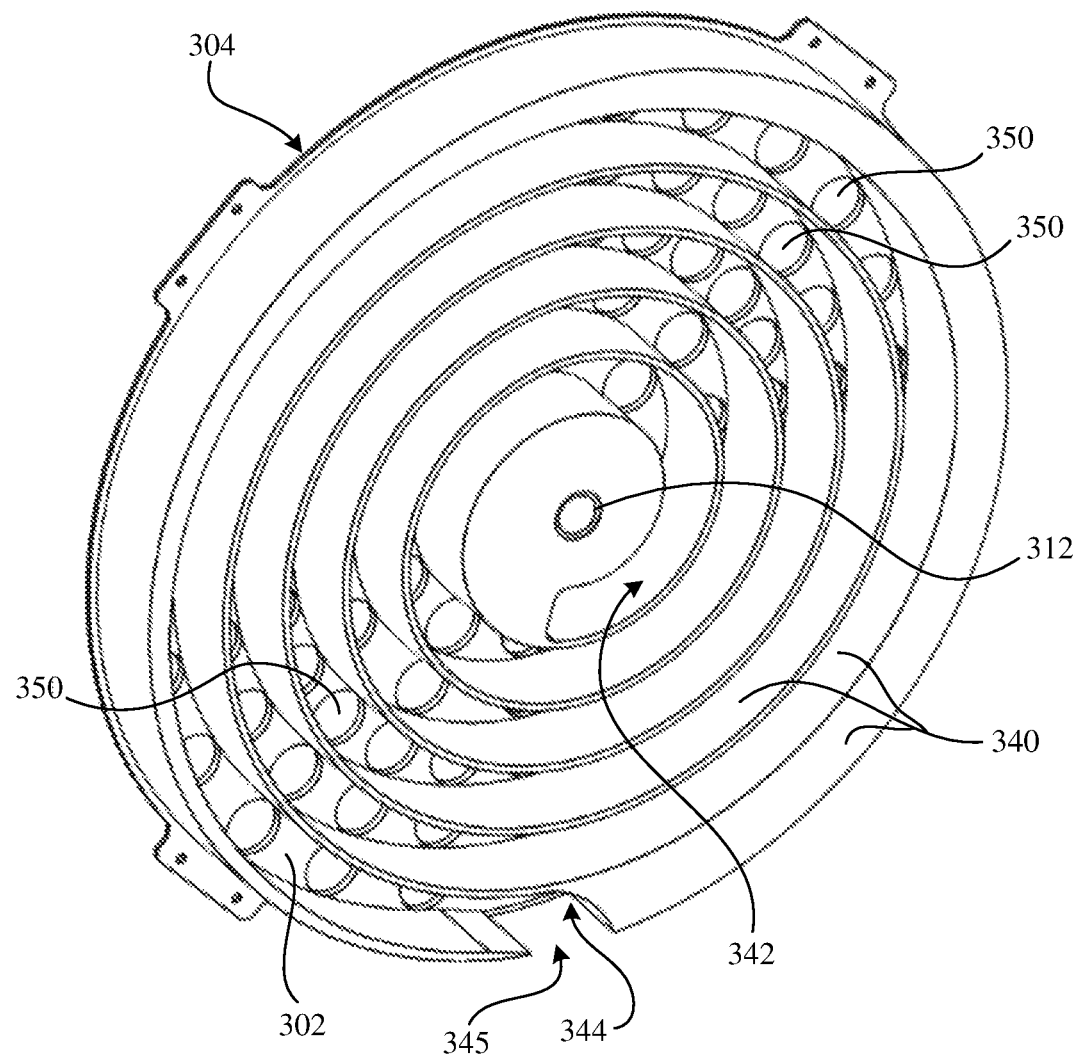
Figure 3D:
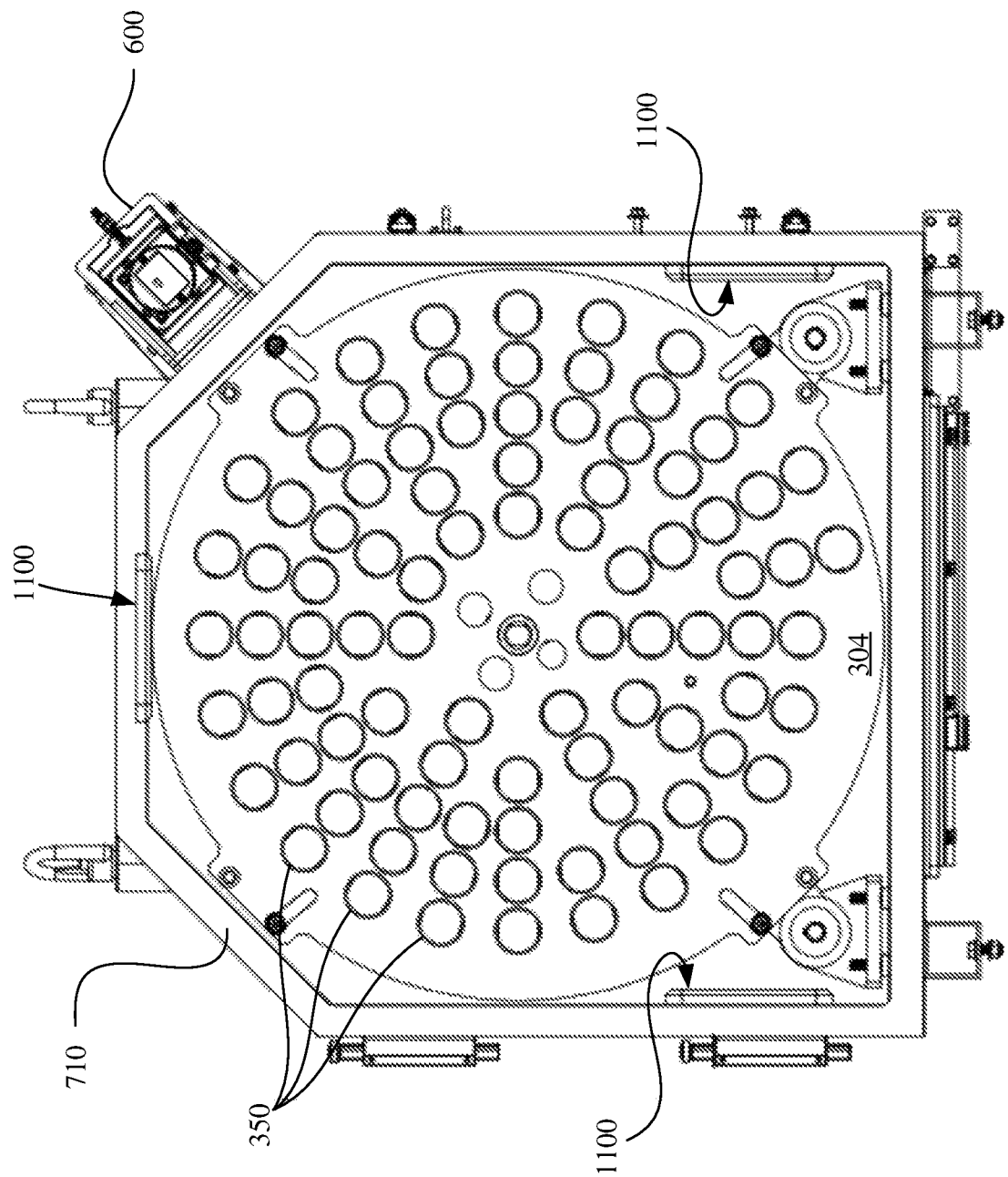
Figure 3F:
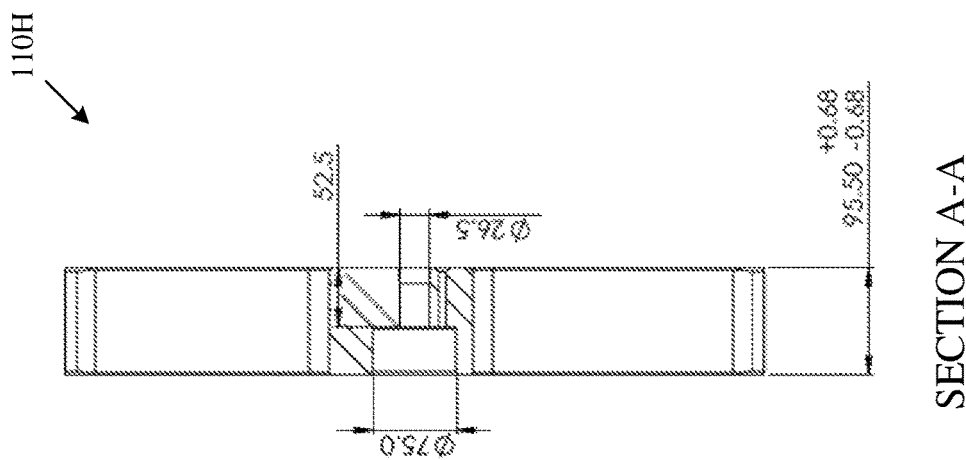
Figure 3F:
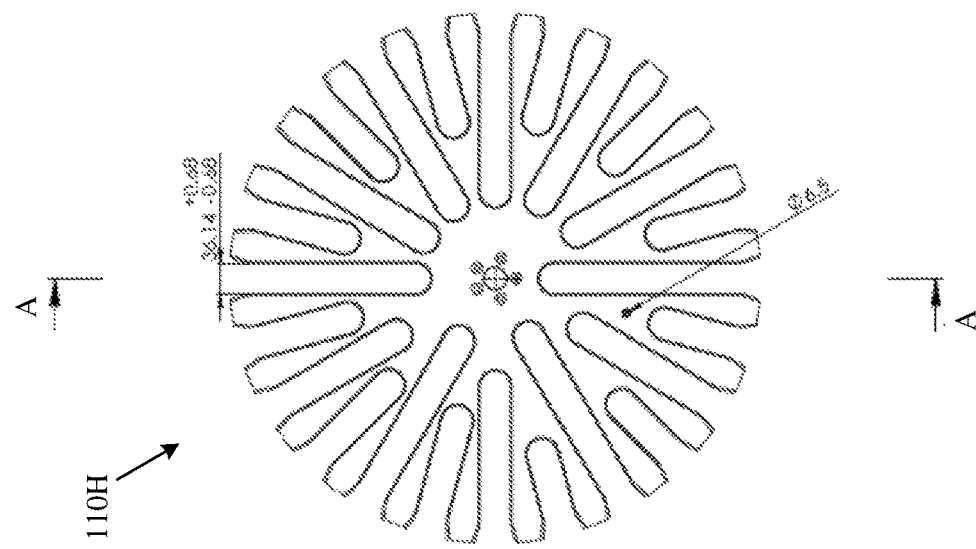
Figure 3E:
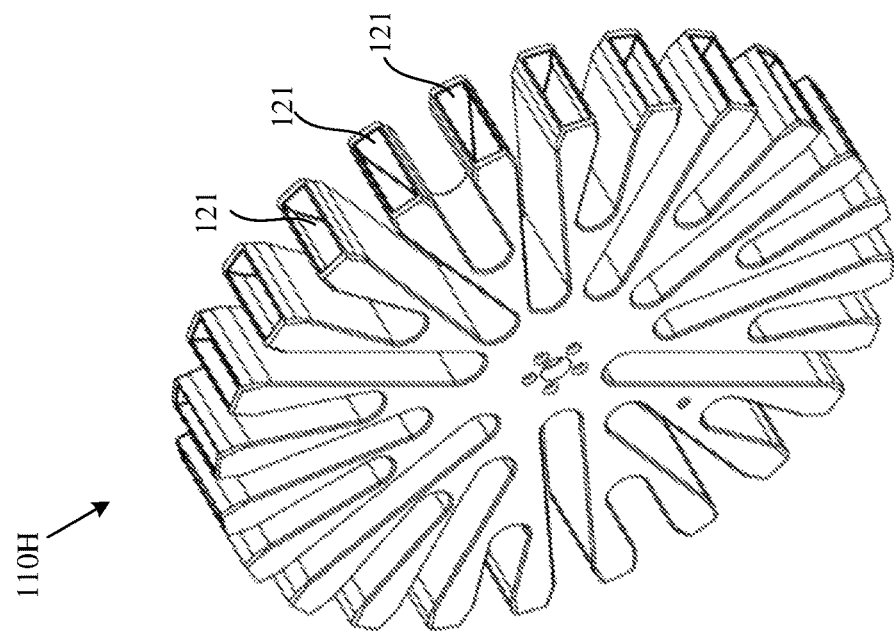

The carrier 110 can have essentially hollow arms 121 between adjacent ones of the slots 120, and forming hollow arms can make the carrier 110 lighter than it would be with solid arms, e.g., as shown in FIG. 3E.

2. Drive Shaft

An elongate drive shaft or shaft 200 extends through the carrier's central aperture 112. The shaft 200 has a lengthwise or longitudinal axis that is coincident with the magazine's longitudinal axis 102. The shaft 200 is securely couplable, coupled, or attached to the carrier 110, e.g., at and/or around the carrier's central aperture 112, such that the shaft's longitudinal axis and the magazine's longitudinal axis 102 are aligned or coincident, and rotation of the shaft 200 about its longitudinal axis rotates the carrier 110 about the corresponding magazine's longitudinal axis 102. Hence, rotation of the shaft 200 rotates the carrier 110.

3. Spiral Guide Structure(s)

A set of spiral guide structures 300, which typically includes or consists essentially of a first or front spiral guide structure 300*f* disposed forward of, or in front and adjacent to the carrier's exposed front surface 116*f*, and a second or rear spiral guide structure 300*r* disposed rearward of or behind and adjacent to the carrier's exposed rear surface 116*r*, is configured for establishing or providing a spiral travel channel/path 342 for initiation device components held by the carrier's slots 120 as the carrier 110 is rotated, e.g., in response to rotation of the shaft 200. In various embodiments, the spiral guide structure(s) 300 need not or do(es) not rotate about the magazine's longitudinal axis 102, e.g., the spiral guide structure(s) remain stationary during carrier rotation.

Each set of spiral guide structures 300 is disposed or fixed relative to the corresponding carrier 110 such that the spiral guide structures 300 can rotate about their spiral axis relative to the corresponding carrier 110, but such that the spiral guide structures 300 are fixed at a selected axial distance from the corresponding carrier 110 such that the spiral guide structures 300 cooperatively carry the initiation device components with the corresponding carrier 110 even as they rotate relatively, e.g., due to the motor 600 driving the carrier 110 to rotate.

Each spiral guide structure 300 has a centroid or center point that resides within a central opening or aperture 312 of the spiral guide structure 300, where the spiral guide structure central opening 312 is cooperatively alignable or aligned with the carrier's central opening 112, such that the magazine's longitudinal axis 102 and the longitudinal axis of the shaft 200 are coaligned with the central opening 312H FIG. 3C is a perspective view of a front spiral guide structure 300*f* in accordance with an embodiment of the present disclosure, where this perspective view is taken along a direction from an underside 302 of the front spiral guide structure 300*f* toward a front or outer surface 304 of the spiral guide structure 300*f*.

With reference to FIGS. 3A and 3C, when the carrier 110 is rotated in an initiation component/device dispensing direction, the initiation device components, e.g., the initiation device head units 10 or the initiation device booster units 50, carried by the magazine 100 follow or are displaced (e.g., slidably displaced) along the spiral travel channel/path 342 in a progressive and/or indexed manner, which progressively moves the initiation devices components carried by the magazine 100 (*a*) around the magazine's longitudinal axis 102, and (b) radially outward away from the magazine's central axis 102. As a particular set of initiation device components held along the depth of a given slot 120 is rotatably displaced around the spiral travel channel/path 342 in the dispensing direction, each initiation device component held by the slot 120 is progressively displaced in a radially outward direction away from the magazine's longitudinal axis 102, toward the slot's exit aperture 124.

More particularly with respect to the foregoing, each spiral guide structure 300f,r has a centroid or center point located within a central aperture opening 312 through which the shaft 200 can extend, and which is cooperatively aligned with the central opening 112 of the carrier 110. Hence, each spiral guide structure 300f,r is cooperatively aligned with the carrier 110. Each spiral guide structure 300f,r includes a spiral shaped support member 340 that projects perpendicular to the first spatial plane, e.g., along the spatial z axis, in a direction toward the carrier 110. The spiral shaped support member 340 provided by the front spiral guide structure 300f provides or establishes a front spiral travel channel/path 342; and the spiral shaped support member 340 provided by the rear spiral guide structure 300r provides or establishes a rear spiral travel channel/path 342. The front and rear spiral guide structures 300f,r and their spiral shaped support members 340 are cooperatively aligned relative to each other, with the carrier 110 disposed therebetween, such that initiation device components in the slots 120 can be smoothly displaced along a common or unified spiral travel channel/path 342, corresponding to or defined as the cooperatively aligned front spiral travel channel/path 342 and rear spiral travel channel/path 342, as the carrier 110 is rotated.

The magazine 100 includes axial separations between adjacent relatively rotating elements (i.e., the carrier 110 and its adjacent spiral guide structures 300f,r), including axial separations in the form of a front axial separation between the carrier 110 and the front spiral guide structure 300f, and a rear axial separation between the carrier 110 and the rear spiral guide structure 300r. These axial separations are sufficiently large keep the relatively rotating elements apart to avoid or mitigate interference between the adjacent elements which may undesirably cause friction, heating and/or damage, and/or may allow manufacturing of the rotating elements with lower tolerances. The axial separations are sufficiently small to avoid or mitigate the units 10,50 falling or dislodging into the axial separations. The axial separations may be between 1 mm and 20 mm, e.g., essentially 2 mm to 5 mm. The axial separation may be tapered, with a smaller axial separation closer to the axis and a larger axial separation further from the axis, e.g., to allow for larger axial movement or flexing of radially outer portions of the relatively rotating elements.

With respect to a particular portion (i.e., middle portion or end portion) of a given initiation device component, e.g., initiation device head unit 10 or initiation device booster unit 50, that is retained in a carrier slot 120, a given spiral shaped support member 340 under consideration is configured for supporting another distinct portion of the initiation device component along the spiral travel channel/path 342 provided or established by the spiral shaped support member 340. When the particular portion (carried in the carrier 110) is the middle portion, the other distinct portion includes the two end portions towards the opposed longitudinal ends of the initiation device: i.e., there can be one carrier 110 between two spiral guide structures 300f,b. When the particular portion (carried in the carrier 110) includes one or both end portions, the other distinct portion includes the middle portion: i.e., there can be one spiral guide structure between two carriers 110.

As indicated in FIG. 3C, the front spiral guide structure 300f includes a plurality of apertures or openings 350 in its front or outer surface 304. More particularly, the front spiral guide structure 300f includes a plurality of openings 350, which are arranged or disposed across the cross-sectional area of the front spiral guide structure 300f in a manner that corresponds or directly corresponds to the organization/pattern and depths of the slots 120 provided by the carrier 110. For a head unit magazine 100H, initiation device head units 10 can be loaded or inserted into the head unit magazine 100H by way of insertion of the head units 10 into and through the apertures 350 of the head unit magazine's front spiral guide structure 300f into particular slots 120 of the head unit magazine's carrier 110. Correspondingly, for a booster unit magazine 100B, initiation device booster units 50 can be loaded or inserted into the booster unit magazine 100B by way of insertion of the booster units 50 into and through the apertures 350 of the booster unit magazine's front spiral guide structure 300f and into particular slots 120 of the booster unit magazine's carrier 110. Because in several embodiments the slots 120 do not all have the same depth and may not all be evenly or uniformly spaced apart from each other about the magazine's longitudinal axis 102, the carrier 110 of the head unit magazine 100H and that of the booster unit magazine 100B may need to be rotated to a loading position in order to load a maximum number of head units 10 into the head unit magazine 100H and booster units into the booster unit magazine 100B, respectively.

As indicated in FIG. 3C, the spiral shaped support member 340 includes an exit guide segment or section 344 proximal to a terminal end thereof, which directs or guides initiation device components to an outlet including an exit opening/aperture 345 of the front spiral guide structure 300f as they exit or are discharged from the spiral travel channel/path 342.

4. Case Structure

A case structure 400 at least partially surrounds the carrier 110 and typically each spiral guide structure 300, e.g., the carrier 110 and each of front and rear spiral guide structures 300f,r is at least partially encased by the cover structure 400. The case structure 400, which may be referred to as a "circular case" or "circular case structure", typically has an elliptical or circular cross-sectional area parallel to the aforementioned first spatial plane. The case structure 400 includes a portion of the outlet in the form of a discharge aperture 402 at a bottom portion thereof corresponding to the exit guide section 345 of each spiral shaped support member 340.

Once an initiation device head unit 10 in a head unit magazine 100H or an initiation device booster unit 50 in a booster unit magazine 100B has been displaced around the spiral travel channel/path 342 in the head unit magazine 100H or booster unit magazine 100B, respectively, and has traveled along the spiral travel channel/path 342 and arrived at an outward-most radial distance away from the magazine's longitudinal axis 102 and is aligned with the case structure's discharge aperture 402, it can exit the head unit magazine 100H or booster unit magazine 100B, further respectively, e.g., simply by way of the force of gravity acting thereon.

5. Removable/Detachable Lid Structure

Several embodiments additionally include a removable or detachable lid structure 500, which can overlay the front spiral guide structure 300f for purpose of facilitating or enabling secure retention of the initiation device components carried in the magazine 100. The lid structure 500 can be removably secured to portions of the cover structure 400 and/or the front spiral guide structure 300f, such as by way of fasteners (e.g., screws and/or secure latches), in a manner understood by individuals having ordinary skill in the relevant art. When the lid structure 500 is removed, initiation device components can be loaded into the magazine's slots 120.

The lid structure 500 also has a centroid or center point that resides within a central opening or aperture 512 of the lid structure 500, where the lid structure central opening 512 is cooperatively alignable or aligned with the carrier's central opening 112.

6. Drive Mechanism(s)/Motor(s)

For a given magazine 100, the shaft 200 thereof can be coupled to a drive mechanism including a motor 600, for instance, and a chain or belt coupled to the motor 600, in a manner understood by individuals having ordinary skill in the relevant art. Activation of the motor 600 rotates the shaft 200, which correspondingly rotates the carrier 110, which correspondingly displaces the initiation device components disposed along the slots 120 around the unified spiral travel channel/path 342. Once a given initiation device component arrives at the discharge aperture 402, it can exit the magazine 100 by way of gravitational force acting on the component. Depending upon embodiment and/or situational details, the motor 600 can reside at any of multiple different locations on, corresponding to, or associated with the magazine 100 or equipment or a vehicle 7000 configured for transporting the magazine 100.

In view of the foregoing, it can be noted that the shaft 200 can extend through cooperatively aligned openings in each of the rear spiral guide structure 300r, the carrier 110, the front spiral guide structure 300f, and possibly the removable lid structure 500. The shaft 200 can be supported within a given central opening by a bearing assembly 205, in a manner understood by individuals having ordinary skill in the relevant art.

Further in view of the foregoing, during magazine operation, e.g., in association with which initiation device components are displaced in a progressive and/or indexed manner along the spiral travel channel/path 342 and initiation device components are sequentially output or discharged from the magazine 100, in several embodiments the only moving or rotationally displaced elements or parts of the magazine 100 internal to the case structure 400 are the shaft 200 and the carrier 110 coupled thereto. In such embodiments, while the carrier 110 is rotated by the shaft 200, each spiral guide structure 300 and the case structure 400 remain stationary relative to the rotational motion of the carrier 110 and the shaft 200. While the shaft 200 rotates the carrier 110, the lid structure 500 typically also remains stationary with respect to the rotational motion of the carrier 110 and the shaft 200.

The drive mechanism may apply a torque of 1,000 oz-in to 100,000 oz-in to the shaft 200. The motor 600 may have a max torque for ramp up/start up of essentially 140 oz-in, and torque after ramp up of essentially 20 oz-in, and the motor 600 may include a 100:1 gearbox and a 3:1 pulley ratio, so the torque at the shaft 200 may be essentially 140*100*3=42,000 oz-in for ramp up, and essentially 20*100*3=6000 oz-in after ramp up.

7. Day Box/Carry Box Enclosure or Housing Structure

In various embodiments, a magazine apparatus or magazine 100 includes or resides in a day box/carry box enclosure structure or enclosure 700 (which may be referred to as a "box enclosure" or "explosives box enclosure"), e.g., a head unit magazine 100H includes or resides in a corresponding head unit magazine day box/carry box enclosure structure 700h, and a booster unit magazine 100B includes or resides in a corresponding booster unit magazine day box/carry box enclosure structure 700b. Each day box/carry box enclosure structure 700 is configured to meet regional and/or national requirements set forth by one or more states, multi-state regions, countries, and/or multi-country regions for explosives day boxes and/or carry boxes. The day box/carry box enclosure structure 700 includes a plurality of wall structures or walls 710 that surround the above-described elements of the magazine 100, where each wall 710 is formed of one or more layers of material(s) and/or material compositions that satisfy such requirements for explosives day boxes/carry boxes.

The day box/carry box ("daybox") may include a 0.12 inch-thick stainless steel wall outside, ½ inch layer of A/C grade plywood inside, and a ½ inch layer of gypsum board (drywall) sandwiched between the inside and the outside, e.g., per IME SLP-22 (Institute of Makers of Explosives) requirements for a daybox.

A day box/carry box enclosure structure 700 can include an initiation device component discharge port 760, e.g., along portions of an underside wall 710u thereof, e.g., which can be configured to interface with an assembly apparatus such as that described below. A day box/carry box enclosure structure 700 can include a mechanized or automated door device 770 having a door structure or door 775 configured to selectively open when an initiation device component is discharged or released from the magazine 100, e.g., into the assembly apparatus, and which otherwise remains securely closed. Such a door device 770 can include or be coupled to a linear displacement mechanism 772 such as a linear actuator configured for selectively opening and closing the door 775, in a manner understood by individuals having ordinary skill in the relevant art.

Each day box/carry box enclosure structure 700 typically includes a removable/openable wall structure 710, such as a forward or front wall structure 710f that can be taken off of and/or swung away from the other wall structures 710 of the day box/carry box enclosure structure 700, to enable access to the magazine's removable lid structure 500, such that initiation device components can be loaded into the magazine's slots 120. The front wall structure 710f can be securely removably attached to a plurality of other wall structures 710 by way of fasteners (e.g., screws) and/or secure latches, in a manner understood by individuals having ordinary skill in the relevant art.

8. Initiation Device Tracking Unit(s)

In various embodiments, the magazine 100 further includes the initiation device tracking unit(s) in the form of one or more radio-frequency (RF) code readers, e.g., RFID code readers, and/or in the form of one or more optical code readers, e.g., 1D or 2D code readers for reading barcodes or QR codes.

The magazine 100 may include the RFID code readers and an RFID scanner/reader unit 1000, e.g., which includes a power source such as a set of batteries (e.g., rechargeable batteries) and/or a coupling to a source of line power. The RFID code readers may be in the form of an array of RFID scanner/reader devices 1100, configured for reading the RFID tags 15, 25, 55, 85 carried by the initiation device components that reside in the magazine 100. More particularly, each RFID scanner/reader unit 1000 includes at least one RFID scanner/reader device 1100 having a processing unit (e.g., a microprocessor or a microcontroller); a memory in which program instructions executable by the processing unit (e.g., a control program) and data, including RFIDs read by each RFID scanner/reader device 1100 are stored; and a data communication unit 1200 coupled to the RFID scanner/reader devices 1100, e.g., in a number of embodiments a wireless communication unit 1200, by which RFIDs read by the RFID scanner/reader device(s) 1100 can be communicated to an external or remote destination, network/network address, computer system, or electronic/computing device that is separate or distinct from the magazine 100. The number of RFID scanner/reader devices 1100 provided by the RFID scanner/reader unit 1000 is selected or established such that the RFID scanner/reader devices 1100 can accurately identify each and every initiation device component held in the carrier's slots 120 in a consistent/reliable manner, regardless of whether the slots 120 of magazine 100 are fully loaded or partially loaded with initiation device components, or entirely empty, when the carrier 110 is stationary as well as when the carrier 110 is rotating relative to the magazine's longitudinal axis 102. In some embodiments, the set of RFID scanner/reader devices 1100 includes four RFID scanner/reader devices 1100 carried by the removable lid structure 500, e.g., disposed on an inner surface thereof, which faces toward the front spiral guide structure 300f, where a given RFID scanner/reader device 1100 is configured for accurately and reliably detecting and reading the RFIDs of initiation device components corresponding to or residing in at least a particular quadrant of the carrier 110.

For a given magazine 100, the RFID scanner/reader unit 1000 thereof can be configured (e.g., programmably or programmatically configured) for scanning/reading the RFIDs of the initiation device components 10, 50 carried in the slots 120 of the magazine's carrier 110; and communicating such RFIDs to one or more external or remote destinations. Such RFID scanning/reading can occur on a particular repeated, recurring, or periodic basis, e.g., a programmably or programmatically selected or specified basis, such as every 1 minute, 3 minutes, 5 minutes, 10 minutes, 15 minutes, 20 minutes, 30 minutes, 45 minutes, and/or 60 minutes, depending upon situational and/or embodiment details. Similarly, such RFID communication to one or more external or remote destinations can occur on a particular repeated, recurring, or periodic basis, e.g., a programmably or programmatically selected or specified basis, such as every 1 minute, 3 minutes, 5 minutes, 10 minutes, 15 minutes, 20 minutes, 30 minutes, 45 minutes, and/or 60 minutes, and/or on a shift-wise or daily basis, depending upon situational and/or embodiment details.

In view of the foregoing, an overall or complete magazine apparatus 100 configured for handling initiation device head units 10 and initiation device booster units 50 in accordance with an embodiment of the present disclosure includes a head unit magazine 100H and a booster unit magazine 100B, and hence includes a distinct carrier 110; a distinct set of spiral guide structures 300 (e.g., a distinct front spiral guide structure 300f and a distinct rear spiral guide structure 300r); a distinct case structure 400; a distinct removable lid structure 500; a distinct day box/carry box enclosure structure 700; and a distinct RFID scanner/reader unit 1000 corresponding to each of the head unit magazine 100H and the booster unit magazine 100B.

As shown in FIG. 3D, the magazine 100 may include the RFID scanner/reader devices 1100 attached, fixed, mounted and located around the carrier 110, i.e., radially further from the longitudinal axis 102 than the exit openings 124 of the slots 120. The RFID scanner/reader devices 1100 may include two RFID scanner/reader devices 1100 or three the RFID scanner/reader devices 1100 as shown in FIG. 3D. As shown in FIG. 3D, 1st and 2nd RFID scanner/reader devices 1100 can be mounted on the lower right and left sidewalls of the magazine 100, and the 3rd RFID scanner/reader device 1100 can be mounted at the top wall. The RFID scanner/reader devices 1100 are mounted such that their reading faces are exposed to the interior of the magazine 100, where the initiation devices are stored and carried. The RFID scanner/reader devices 1100 can be slim rectangular-like structures, e.g., based on or implemented by way of off-the-shelf scanners/readers, e.g., with an operational frequency between 100 kHz and 10 GHz, including 100 MHz to 1 GHz, e.g., 860-960 MHz, e.g., at a power level of 30 db.

The magazine 100 may include the optical code readers and an optical scanner/reader unit (instead of or in addition to the RFID unit 1000), e.g., which includes a power source such as a set of batteries (e.g., rechargeable batteries) and/or a coupling to a source of line power. The optical code readers may be in the form of an array of barcode or QR code scanner/reader devices, configured for reading the optical code tags carried by the initiation device components that reside in the magazine 100.

Additionally or alternatively, the RFID scanner/reader unit 1000 and/or the optical scanner/reader unit may be mounted and fixed to the magazine 100 in a position to read/scan the non-contact readable ID codes at an input location (i.e., where the devices 81/components 10,50 are inserted into the magazine 100), and/or at an output location (i.e., where the devices 81/components 10,50 are dispensed from the magazine 100). Having the scanner/reader located at the input or output location may be preferable for the optical units if the non-contact readable identification (ID) codes are optically obscured when being held in the magazine 100.

Aspects of an Assembly Apparatus

Figure 4:
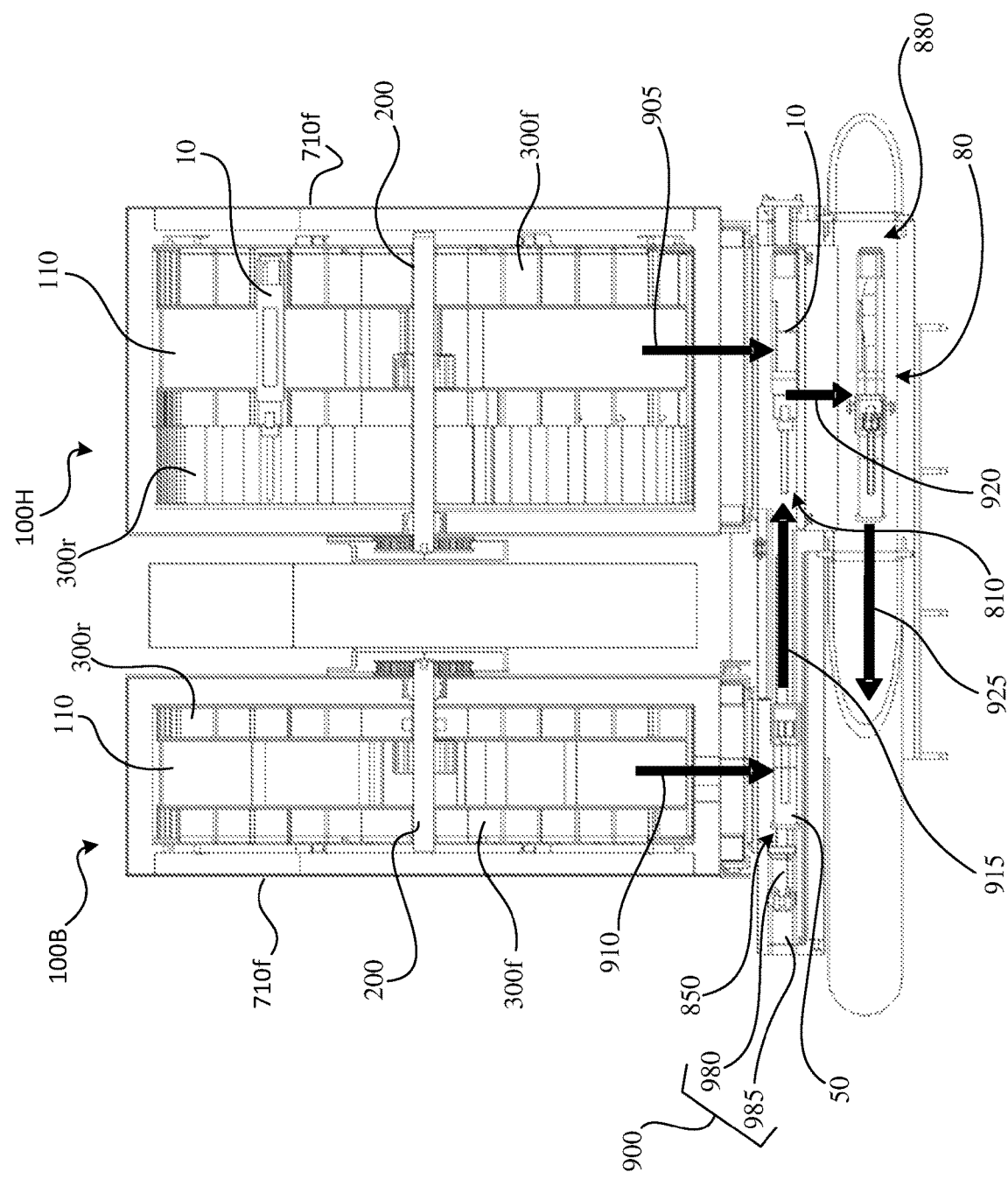
FIG. 4 illustrates particular aspects of the first magazine apparatus/magazine interfaced with an associated assembly apparatus in accordance with some embodiments of the present disclosure.

FIG. 4 is a cross-sectional illustration showing portions of a head unit magazine 100H, a booster unit magazine 100B, and an assembly apparatus 800 associated therewith according to an embodiment of the present disclosure. In an embodiment, the assembly apparatus includes an initiation device head unit compartment, or simply head unit compartment 810; an initiation device booster unit compartment, or simply booster unit compartment 850, which is cooperatively aligned with the head unit compartment 810; a mechanized or automated joining apparatus or device 900 configured for controllably securely joining or assembling a initiation device unit 10 located in the head unit compartment 810 together with an initiation device booster unit 50 located in the booster unit compartment 850; and an assembled initiation device compartment 880, into which an assembled or unified initiation device 80 can be transferred or reside such that it can be further transferred or conveyed to a borehole loading location.

More particularly, in an embodiment once an initiation device head unit 10 and a corresponding, complementary, or counterpart initiation device booster unit 50 have been output in a essentially downward direction 905,910 (by gravity) correspondingly (in a corresponding manner) from the head unit magazine's discharge aperture 402h and the booster unit magazine's discharge aperture 402b, where "correspondingly" or "corresponding manner" refers to a one-to-one correspondence, e.g., cooperatively, in a coordinated manner, together, in tandem, or approximately or essentially simultaneously as a pair of complementary initiation device components (i.e., one unit 10 and one unit 50), the head unit 10 and the booster unit 50 can be received or captured in the head unit receiving compartment 810 and the booster unit receiving compartment 850, respectively. The assembly apparatus 800 and/or each discharge aperture 402 can include receiving and/or guiding structures such as funnel structures configured for smoothly and accurately delivering the head unit 10 into the head unit receiving compartment 810 and the booster unit 50 into the booster unit receiving compartment 850.

In various embodiments, when a given head unit 10 and a given complementary or counterpart booster unit 50 reside in the head unit receiving compartment 810 and the booster unit receiving compartment 850, respectively, the head unit 10 and the booster unit 50 are inherently aligned or auto-aligned in a manner that facilitates or enables their automated structural coupling or connection, e.g., by virtue of the physical structure of such compartments 810, 850 and their spatial alignment and orientation relative to each other. For instance, the head unit 10 and the booster unit 50 can be inherently or automatically aligned, e.g., lengthwise aligned, relative to or along a common assembly axis when they reside in the head unit compartment 810 and the receiving unit compartment 850, respectively.

The joining apparatus or device 900 can include at least one selectively displaceable pushing element, pushing structure, or pusher/plunger 980 that is configured for causing or producing relative motion, e.g., in an essentially horizontal direction 915, between the head unit 10 and the booster unit 50 such that the distance between the head unit 10 and the booster unit 50 progressively decreases, until the head unit 10 and the booster unit 50 structurally couple and securely join together. The joining apparatus 900 can include a linear displacement mechanism 985, e.g., linear actuator device such as a ball screw or other type of linear displacement mechanism as will be understood by individuals having ordinary skill in the relevant art, configured for translating the pusher/plunger 980 in a manner that decreases the relative distance between the head unit 10 and the booster unit 50, e.g., by way of controllably pushing/displacing the booster unit 50 towards and to the head unit 10. The head unit 10 and the booster unit 50 can each have cooperatively alignable or aligned structural elements, e.g., snap-fit elements, that facilitate their secure coupling or attachment together.

Once a given head unit 10 and a complementary booster unit 50 have been securely joined together to form an assembled, complete, or unified initiation device 80, e.g., a primer, the assembled initiation device 80 can be transferred to the assembled initiation device compartment 880 by way of another pushing device/element/structure/pusher, e.g., such as passage allowing a gravitational force in an essentially downward direction 920. The assembled initiation device 80 in the assembled initiation device compartment 880 can be released in an essentially horizontal direction 925 aligned with the longitudinal axis of the assembled initiation device 80.

Implementation of First Magazine Apparatus

In an implementation, the first magazine apparatus (or "dual magazine") 100X includes the head unit magazine 100H with the booster unit magazine 100B. The overall weight of the dual magazine 100X may be around 50 kg to 500 kg, e.g., essentially 300 kg. The capacity of the dual magazine 100X may be from essentially 10 units to 200 units, e.g., 90 units, i.e., 90 head units 10 and 90 respective booster units 50. The capacity of the dual magazine 100X can be increased by increasing the diameter of the magazines 100H,100B and while keeping the same slot width. The head unit 10 (referred to as a "DRX") may be essentially 300 mm long, including the length of the initiation element 20 of essentially 100 mm, with a maximum diameter of 34 mm. The booster unit 50 may be essentially 150 mm long, also with a maximum diameter of 34 mm. The head unit magazine 100H includes: the carrier 110 in the form of a head unit carrier 110H; the rear spiral guide structure 300r in the form of a head unit rear spiral guide structure 300rH; and the front spiral guide structure 300f in the form of a head unit front spiral guide structure 300fH. The booster unit magazine 100B includes: the carrier 110 in the form of a booster unit carrier; and the rear spiral guide structure 300r in the form of a booster unit rear spiral guide structure 300rB; and the front spiral guide structure 300f in the form of a booster unit front spiral guide structure 300fB.

Figure 3P:
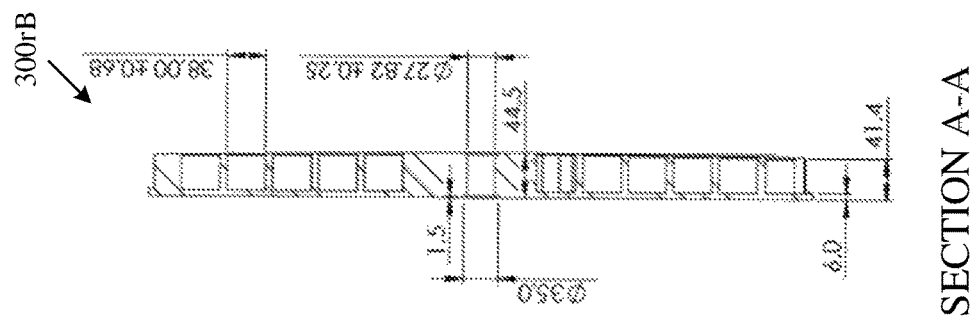
Figure 3O:
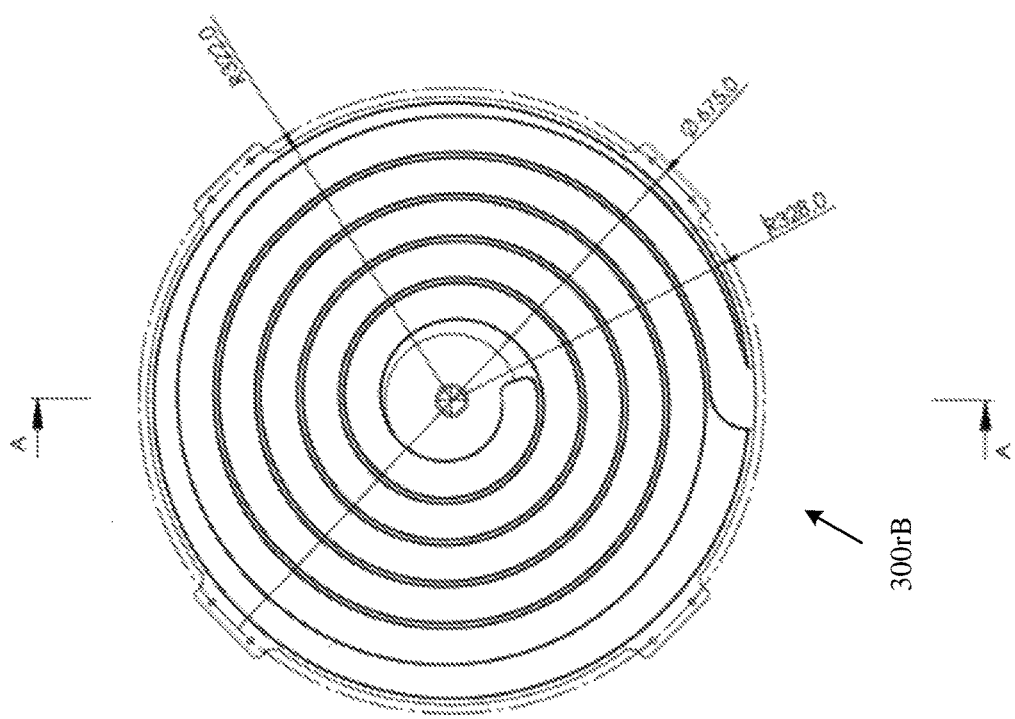
Figure 3N:
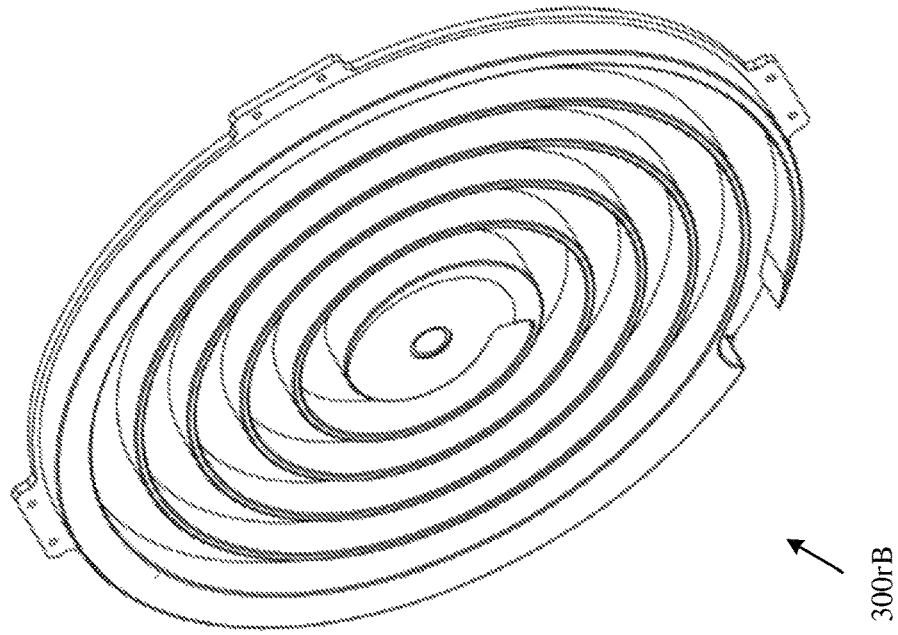
Figure 3R:
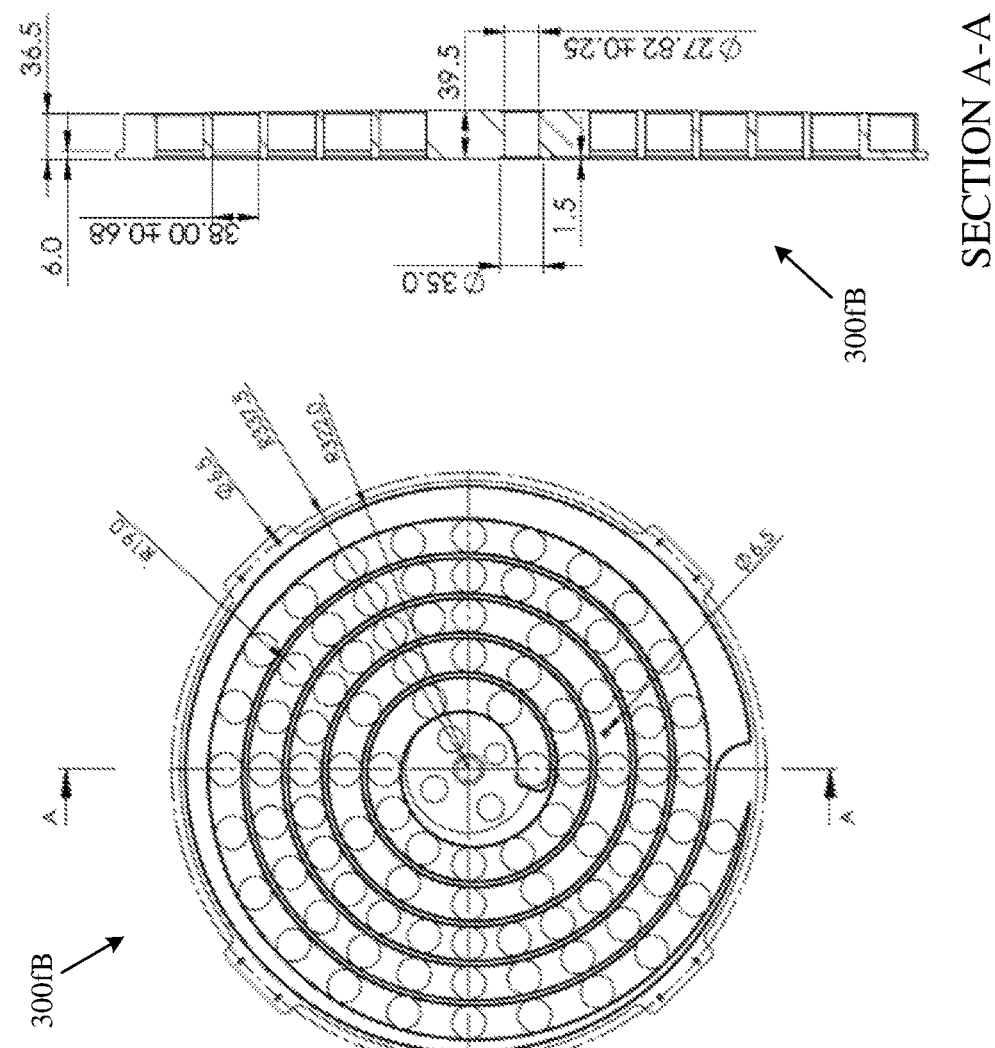
Figure 3Q:
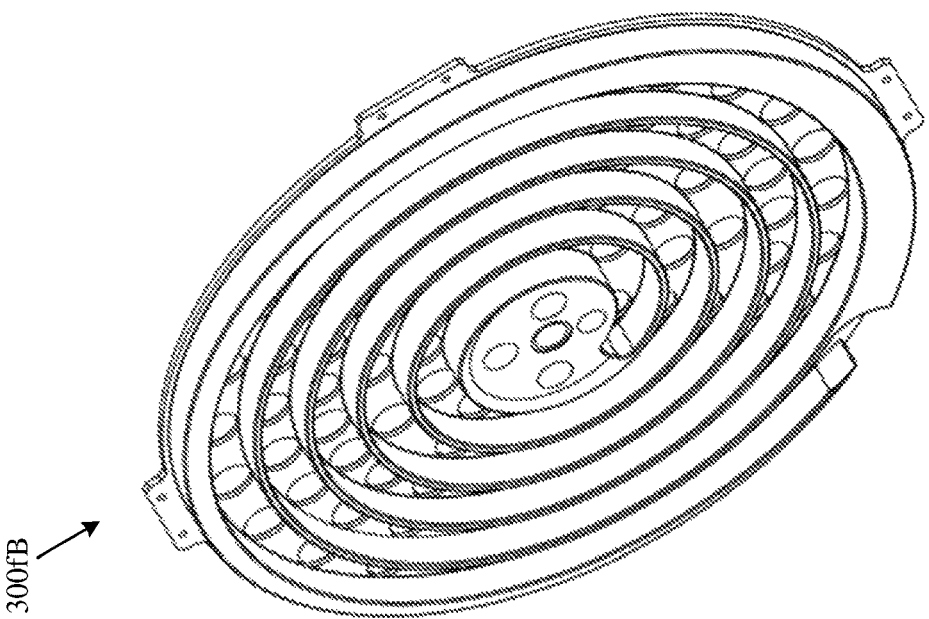

FIGS. 3E to 3G are respectively perspective, front-side and cross-sectional (through the diameter marked AA in FIG. 3F) illustrations of the head unit carrier 110H. The head unit carrier 110H may be formed of a metal (e.g., aluminium/"aluminum") or a plastic (e.g., a 2-part resin), e.g., including 3D-printed plastic shell forming a cavity filled with a glass or aluminum bead epoxy, and may weigh 5 kg to 100 kg, e.g., essentially 40 kg. The slots 120 on the head unit carrier 110H are essentially 36 mm, i.e., around 2 mm larger than the maximum diameter of the head unit 10. FIGS. 3H to 3J are respectively perspective, front-side and cross-sectional (through the diameter marked AA in FIG. 3I) illustrations of the head unit rear spiral guide structure 300rH. The head unit rear spiral guide structure 300rH may be formed of a metal (e.g., aluminium) or a plastic (e.g., a 2-part resin), e.g., including 3D-printed plastic shell forming a cavity filled with a glass or aluminum bead epoxy, and may weigh 5 kg to 100 kg, e.g., essentially 40 kg. FIGS. 3K to 3M are respectively perspective, rear-side and cross-sectional (through the diameter marked AA in FIG. 3L) illustrations of the head unit front spiral guide structure 300fH. The head unit front spiral guide structure 300fH may be formed of a metal (e.g., aluminium) or a plastic (e.g., a 2-part resin), e.g., including 3D-printed plastic shell forming a cavity filled with a glass or aluminum bead epoxy, and may weigh 5 kg to 100 kg, e.g., essentially 14 kg. The booster unit carrier has the same dimensions as the head unit carrier 110H except it is axially thinner, with an (axial) thickness of 79 mm instead of 95.5 mm. The booster unit carrier may be formed of a metal (e.g., aluminium) or a plastic (e.g., a 2-part resin), e.g., including 3D-printed plastic shell forming a cavity filled with a glass or aluminum bead epoxy, and may weigh 5 kg to 100 kg, e.g., essentially 30 kg. The slots 120 on the booster unit carrier are essentially 36 mm, i.e., around 2 mm larger than the maximum diameter of the booster unit 50. FIGS. 3N to 3P are respectively perspective, front-side and cross-sectional (through the diameter marked AA in FIG. 3O) illustrations of the booster unit rear spiral guide structure 300rB. The booster unit rear spiral guide structure 300rB may be formed of a metal (e.g., aluminium) or a plastic (e.g., a 2-part resin), e.g., including 3D-printed plastic shell forming a cavity filled with a glass or aluminum bead epoxy, and may weigh 5 kg to 100 kg, e.g., essentially 10 kg. FIGS. 3Q to 3S are respectively perspective, rear-side and cross-sectional (through the diameter marked AA in FIG. 3R) illustrations of the booster unit front spiral guide structure 300fB. The booster unit front spiral guide structure 300fB may be formed of a metal (e.g., aluminium) or a plastic (e.g., a 2-part resin), e.g., including 3D-printed plastic shell forming a cavity filled with a glass or aluminum bead epoxy, and may weigh 5 kg to 100 kg, e.g., essentially 8 kg.

Aspects of a Second Magazine Apparatus

Figure 5:
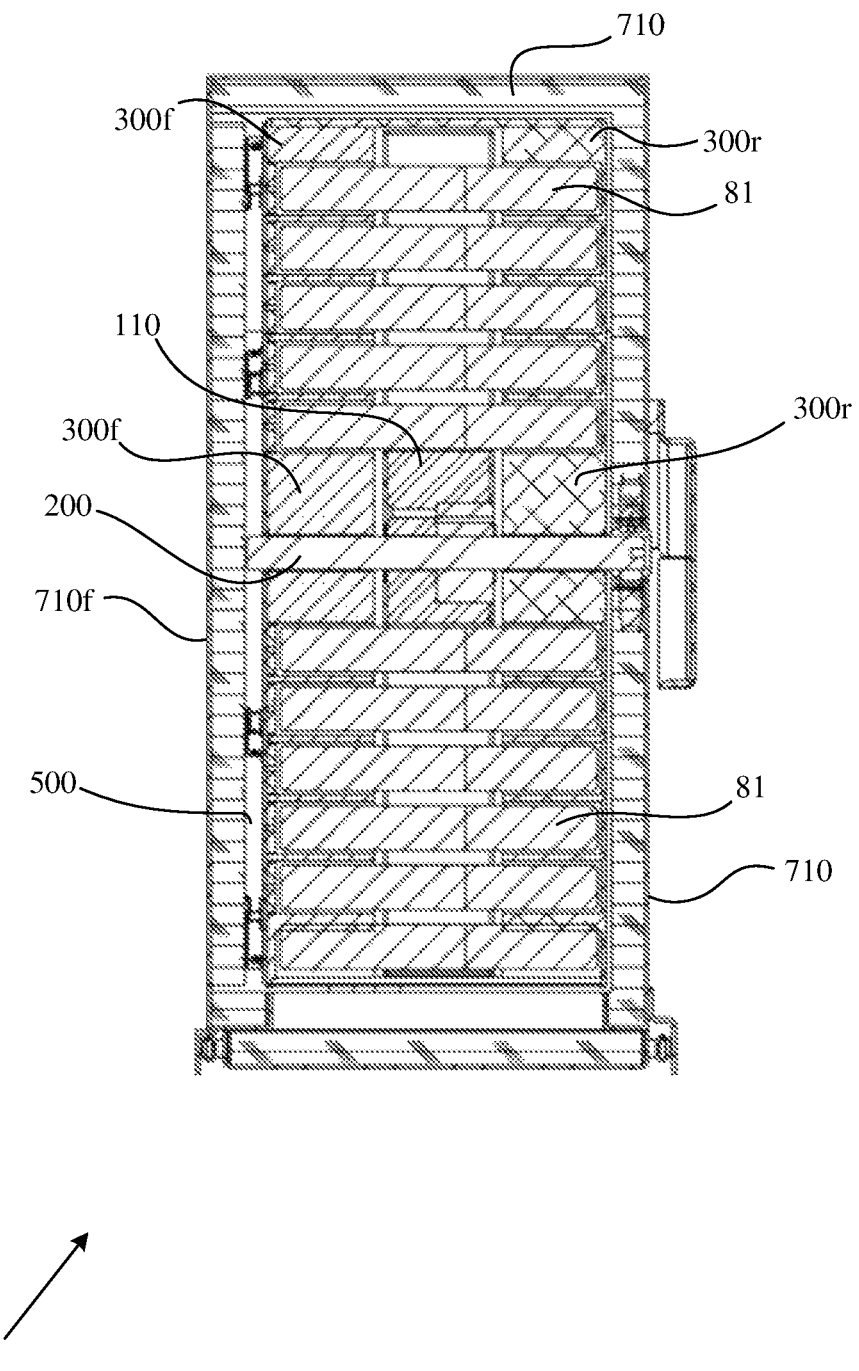
FIG. 5 illustrates particular aspects of a second magazine apparatus in accordance with other embodiments of the present disclosure, which is configured for carrying one-piece initiation devices, e.g., which are fully assembled or which exist as unitary or single-piece devices prior to their loading into the second magazine apparatus.

FIG. 5 illustrates particular aspects of a second magazine apparatus 101 (or "magazine") in accordance with other embodiments of the present disclosure, which is configured for carrying one-piece initiation devices 81, e.g., which are fully assembled or which exist as unitary or single-piece devices such as primer units prior to their loading into the second magazine apparatus 101.

The second magazine apparatus 101 does not include or require each of a head unit magazine 100H and a booster unit magazine 100B, and thus for the second magazine apparatus 101 there is no duplication of a carrier 110, a set of spiral guide structures 300, case structures 400, removable lid structures 500, day box/carry box enclosure structures 700, and initiation device tracking unit(s) corresponding a pairwise-cooperative or pairwise-coordinated head unit magazine 100H and a booster unit magazine 100H. Hence, the second magazine apparatus 101 is formed of a single set of the elements described above, rather than duplicate sets of such elements corresponding to each of a head unit magazine 100H and a booster unit magazine 100B. Moreover, the second magazine apparatus 101 does not include or require an assembly apparatus 800 configured for joining an initiation device head unit 10 together with an initiation device booster unit 50.

Vehicle

Figure 7:
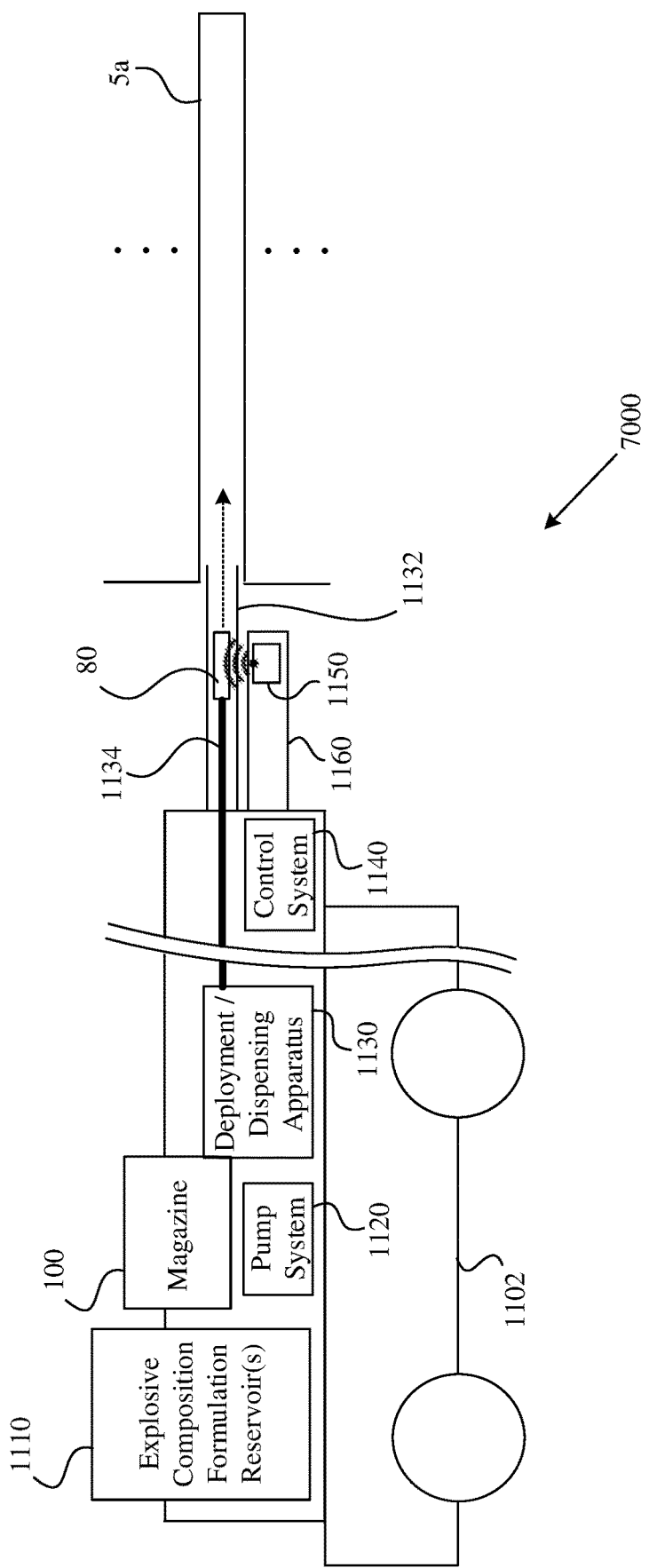
FIG. 7 is a diagram of a vehicle including the magazine apparatus and the associated assembly apparatus.

As shown in FIG. 7, the vehicle 7000 can include the first or second magazine 100,101 and a mobile platform 1102 for carrying and moving the magazine apparatus 100. The magazine 100,101, or a plurality of the magazines 100 or 101, is/are securely mountable or mounted to the vehicle 7000 for transport to a location near or at the borehole 5a. The borehole may be essentially horizontal as shown in FIG. 4, or essentially vertical.

For surface mining, the vehicle 7000 may be large enough to carry the plurality of magazines 100,101. For underground mining, the vehicle 7000 may be smaller and lighter, and may include only one magazine 100,101, which may be of a smaller size and capacity than the magazines 100,101 on the surface-mining vehicle 7000.

As shown in FIG. 7, the vehicle 7000 may include: one or more explosive composition formulation reservoirs 1110; a pump system 1120 connected to the reservoirs 1110 for pumping the compositions into the borehole 5a; a deployment apparatus 1130, connected to the magazine 100, that is configured to receive the initiation device 80,81 from the magazine 100,101, and to deploying the initiation device 80,81 to an arm structure 1134 for loading; the arm structure 1134 configured to load the initiation device 80,81 from the deployment apparatus 1130 into the borehole 5a; and a control system 1140 for automatically controlling the magazine 100,101, the deployment apparatus 1130 and an encoder 1150 to provide the dispensing, the deployment and encoding (by the encoder 1150) of the initiation device 80,81. The vehicle 7000 includes a trough, channel, and/or hollow pipe, tube or hose 1132 through which one or more explosive composition formulations can be pumped into the boreholes by the pump system 1120. For a wireless initiation device 80,81, the vehicle 7000 can include the encoder 1150 (mounted on a support arm 1160) that the wireless initiation device 80,81 passes when being automatically loaded into the borehole 5a, wherein the encoder 1150 is configured to communicate wirelessly with the wireless initiation device 80,81 to send commands and data for establishing or modifying an operational status or state of the wireless initiation device 80,81, e.g., including a delay time, such that the wireless initiation device 80,81 is configured to receive instructions/commands from the remotely located blast control equipment described hereinbefore, e.g., the FIRE command.

Alternatively, the vehicle 7000 may include the magazine(s) 100,101 mounted for manual access by a person, for loading the components/devices into the magazines 100,101 and for gathering the components/devices from the magazines 100,101 when they have been scanned and dispensed (and assembled if required), e.g., to be manually encoded (using a handheld encoder) and placed into the borehole.

Aspects of an Initiation Device Component Tracking System

Figure 6A:
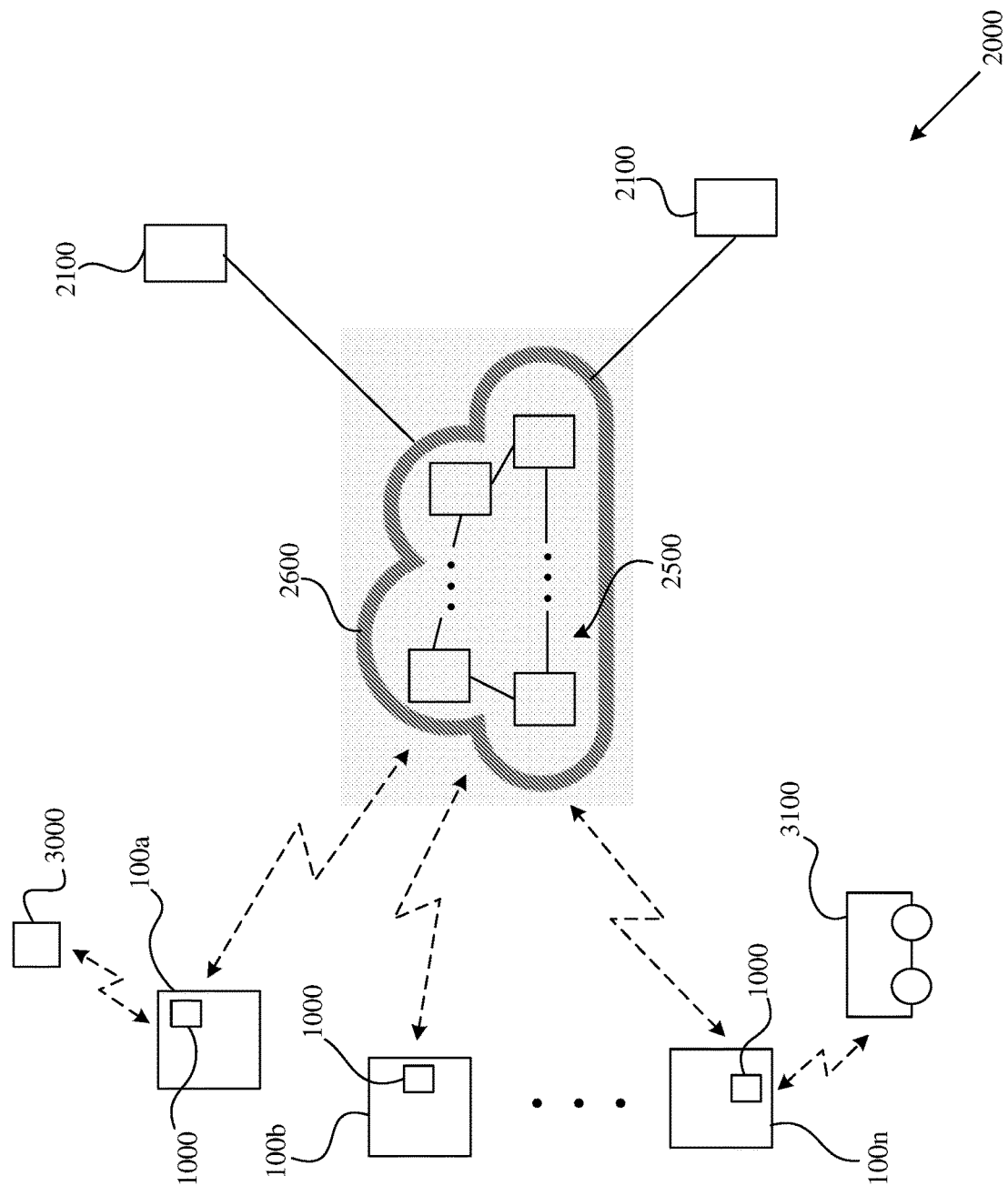
FIG. 6A illustrates particular aspects of a system for storing, transporting, dispensing, and tracking initiation device components and/or initiation devices in accordance with an embodiment of the present disclosure.

FIG. 6A is a block diagram showing particular aspects of an initiation device/component tracking system 2000 ("tracking system", i.e., a system for tracking the initiation devices, e.g., one-piece primers and/or components) in accordance with an embodiment of the present disclosure. In an embodiment, the system 2000 includes at least one, and typically a plurality, of magazine apparatuses 100a-n (each of which is in the form of the dual magazine 100X or the second magazine 101 including respective ones of the initiation device tracking units) in accordance with one or more embodiments of the present disclosure; and at least one remote server system 2100. The magazine apparatuses 100a-n and the remote server system(s) 2100 are configurable or configured for data communication with each other, such as by way of one or more data communication networks 2500 (e.g., including one or more of a Local Area Network (LAN), a Wide Area Network (WAN), a cellular data network, a satellite network, and/or the Internet), one or more of which can be based in a computing cloud 2600. At any given time, the magazine apparatuses 100a-n can reside or be distributed at or across multiple locations associated with one or more commercial blasting environments, such as one or more open cut mine sites and/or one or more underground mine sites (e.g., which are owned/operated by a particular mining company).

Each remote server system 2100 is configured for receiving data including the scanned device IDs, e.g., scanned RFIDs, from the initiation device tracking units (e.g., RFID scanner/reader units 1000) of the respective magazine apparatuses 100a-n, on a repeated, recurring, or periodic basis such as set forth above. Data communication from or between the initiation device tracking unit(s) and the remote server system(s) 2100 can include or involve data transfer, e.g., wireless and/or wire-based data transfer, by way of one or more data communication networks 2500 corresponding to the commercial blasting environment(s) in which the magazines apparatuses 100a-n reside, and the locations of the magazine apparatuses 100a-n in those commercial blasting environments. Hence, data communication from or between initiation device tracking unit(s) and the remote server system(s) 2100 can include data communication by way of or over one or more mine communication networks, in a manner understood by individuals having ordinary skill in the relevant art. For instance, in several embodiments the initiation device tracking unit(s) can wirelessly transfer or communicate current/recent ID datasets identifying initiation devices/components currently/recently carried by the magazines 100a-n to wireless routers of one or more mine communication networks, in a manner also understood by individuals having ordinary skill in the relevant art.

In multiple embodiments, the initiation device tracking unit(s) can also be configurable or configured for data communication (e.g., wireless data communication) with local or positionally-fixed data acquisition and communication devices that reside at particular known locations within a commercial blasting environment such as a mine (e.g., which are mounted at particular mine locations, such as associated and which may be associated with particular types of mine infrastructure); and/or portable/mobile data acquisition and communication devices that are disposable at or transportable to various locations within the commercial blasting environment. Portable/mobile data acquisition and communication devices can be handheld devices 3000 carried by mine personnel, e.g., in the form of blast logging devices or loggers; and/or they can be carried by automated or autonomous vehicles 3100, for instance, autonomous or remotely piloted vehicles such as land-based drones and/or aerial/airborne drones.

The tracking system 2000 can include antennas 5000 and corresponding antenna drive/control units 5100 for sending commands to the initiation devices 80,81, including the commands from the blast control system 4000.

Figure 6B:
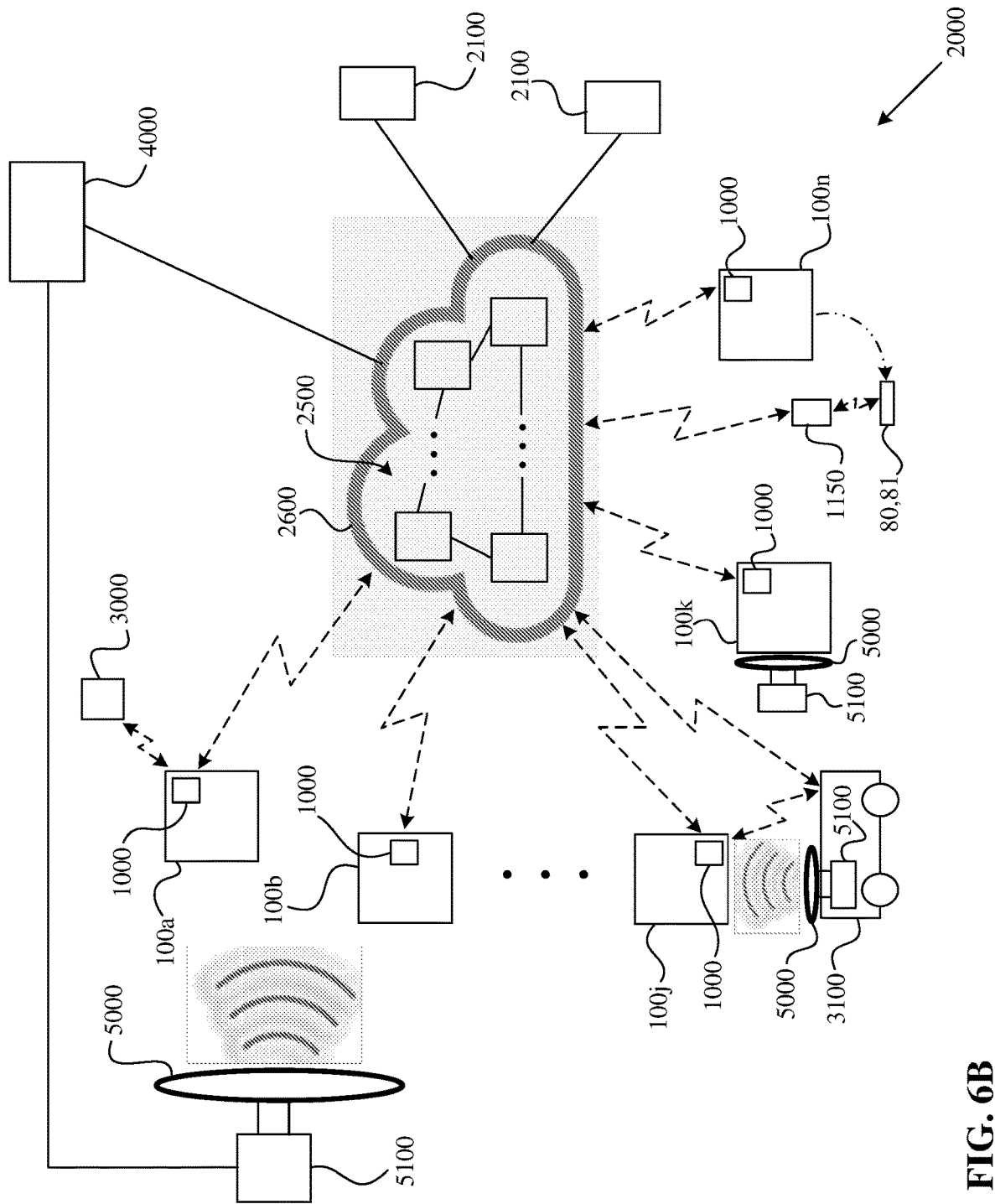
FIG. 6B illustrates further aspects of the system.

The system 2000 configured for non-contact-based initiation component tracking (e.g., head unit tracking, booster unit tracking, initiation element/detonator tracking, or one-piece initiation device tracking) such as shown in FIGS. 6A and 6B, including tracking if any of the scanned ID codes (i.e., scanned by the initiation device tracking unit(s)) correspond to particular identified and stored ID codes in the system 2000 (e.g., stored in the blast control system 4000), wherein the particular identified ID codes are stored (e.g., flagged in a database) to indicate that the corresponding particular initiation device components/initiation devices (e.g., identified by serial number): (a) should not currently reside in the magazines; and/or (b) have been previously dispensed from one or more magazines 100*a-n* (e.g., and were successfully assembled, and/or successfully encoded and thus were expected to have been already loaded into boreholes), but have subsequently been reloaded into any magazine(s) 100*a-n*. If the system 200 tracks (i.e., identifies) that a scanned ID code is in a set of stored ID codes that are flagged as not belonging in the magazines 100*a-n* (e.g., because the scanned ID code is identified as having been encoded), then the system 2000 can (i) generate corresponding alert signals; (ii) for wireless initiation devices, issue wireless disable/reset commands directed to those particular wireless initiation devices by way of antennas 5000 and corresponding antenna drive/control units 5100, while these particular wireless initiation devices reside in the magazine(s); and/or (iii) again for wireless initiation devices, issue commands to encoders 1150 to disable/reset these particular wireless initiation devices after they are dispensed from the magazine(s). The control unit of each initiation device 80,81 has a unique programmable initiation device ID, e.g., allocated by the blast control system when in use, that is programmed and stored in addition to the ID code—i.e., the control unit can receive and store a device ID and a group ID (GID, which defines a group of initiation devices) that are subsequently accessed and used by the control unit during blasting, and these "soft" device and group IDs are different from the "hard" ID codes read by the initiation device tracking unit(s), and which are affixed to the devices/components in the form of the tags/codes, and which are typically not selected and programmed by the system 2000 during operation. Each disable/reset command includes the unique initiation device ID ("soft ID", or "wireless ID") corresponding to a particular wireless initiation device.

As shown in FIG. 6B, the antenna 5000 and its corresponding drive/control unit 5100 can be coupled to the remote blast control system 4000, and remote from the magazines 100*a-n*; or can be carried by the land-based or aerial automated or autonomous vehicle 3100; or can be disposed adjacent to or even carried by the magazine 100*k*.

The tracking system 2000 can automatically determine whether the components being deployed in-field and which were intended to be shipped to and used at a particular mine site (as identified by the set of stored ID codes with appropriate data flags), and which should have been recorded or logged into mine site inventory upon arrival at the mine site (e.g., as part of standard new inventory arrival procedures, using data flags in the blast control system 4000) actually correspond to or came from recorded or logged mine site inventory, or should have been deployed elsewhere (e.g., at another mine site), or are being or should have been transported or deployed at the mine site in accordance with an expected deployment/usage schedule (e.g., based on a current mine plan/mining schedule).

In the system 2000, the blast control system 4000 is configured to record the "hard" IDs of the components/devices (e.g., from the tags 15,25,55,85) in the system 2000 when the components/devices are recorded or logged into mine site inventory. When programming the devices 80,81 with their "soft" devices ID and GIDs, the blast control system 4000 is configured to record which of the "hard" IDs correspond to which "soft" IDs. Then the encoders 1150 are configured to report back to the blast control system 4000 which of the "soft" IDs have been encoded (i.e., which of the devices (80,81) have been encoded, identified by their "soft" IDs). The blast control system 4000 is configured to identify in its data store which of the "soft" IDs have been encoded, and then flag the corresponding "hard" IDs as having been encoded. The blast control system 4000 can then receive signals from the initiation device tracking unit(s) representing the stored "hard" IDs in the magazines 100*a-n*, and can generate an alert if the "hard" codes are not recoded as being ready for dispensing, e.g., if they have been flagged as having been encoded. Alternatively/additionally, the blast control system 4000 can send a dataset ("acceptable dataset"), representing the set of non-contact codes that are recoded as being ready for dispensing, to the initiation device tracking unit(s) (e.g., representing which of the logged "hard" IDs have been logged but not yet encoded). The acceptable dataset can be updated repeatedly as the blast control system 4000 receives "soft" IDs as they are encoded, and the initiation device tracking unit(s) can generate the alert if they read/scan any the "hard" IDs that are not in the acceptable dataset. The blast control system 4000 may be configured to respond automatically to this alert by: (i) issuing a set of notifications or messages to one or more mine personnel; (ii) disarming, disabling and/or resetting the devices/components with the identified "hard" ID; and/or (iii) controlling the encoders 1150 to identify the previously encoded "soft" ID if the corresponding device 80,81 is again presented to an encoder 1150.

The system 2000 thus may remedy a potential safety issue with wireless initiation devices, in that wireless initiation devices can theoretically be triggered to FIRE after they have been encoded, even if they have been moved or transported to a location where they should not reside, because they can receive FIRE commands without wires as long as they are within range of one or more mine site antennas (5000) used to issue commands to wireless initiation devices. If a previously-encoded wireless initiation device has been lost/misplaced and is later reintroduced into a magazine, the tracking system 2000 can at a minimum generate an alert (e.g., such that no wireless FIRE commands will be issued until the alert is resolved), and/or can automatically selectively disable the lost/misplaced wireless initiation device, using a DISARM, disable and/or reset command transmitted from the blast control system 4000 via the antennas 5000, if the initiation device tracking unit(s) detect that it has appeared in one of the magazines 100*a-n* again.

Method

Figure 8A:
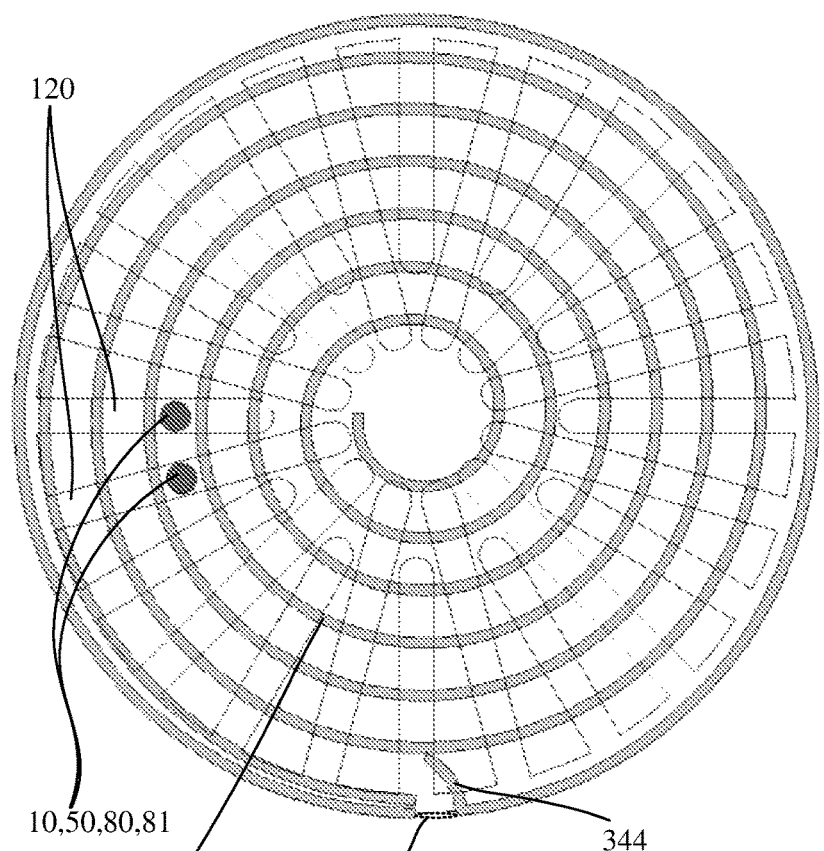
FIGS. 8A to 8C are end-view cross-sectional diagrams of two initiation device components being carried in the spiral guide structure towards an exit aperture.
Figure 8B:
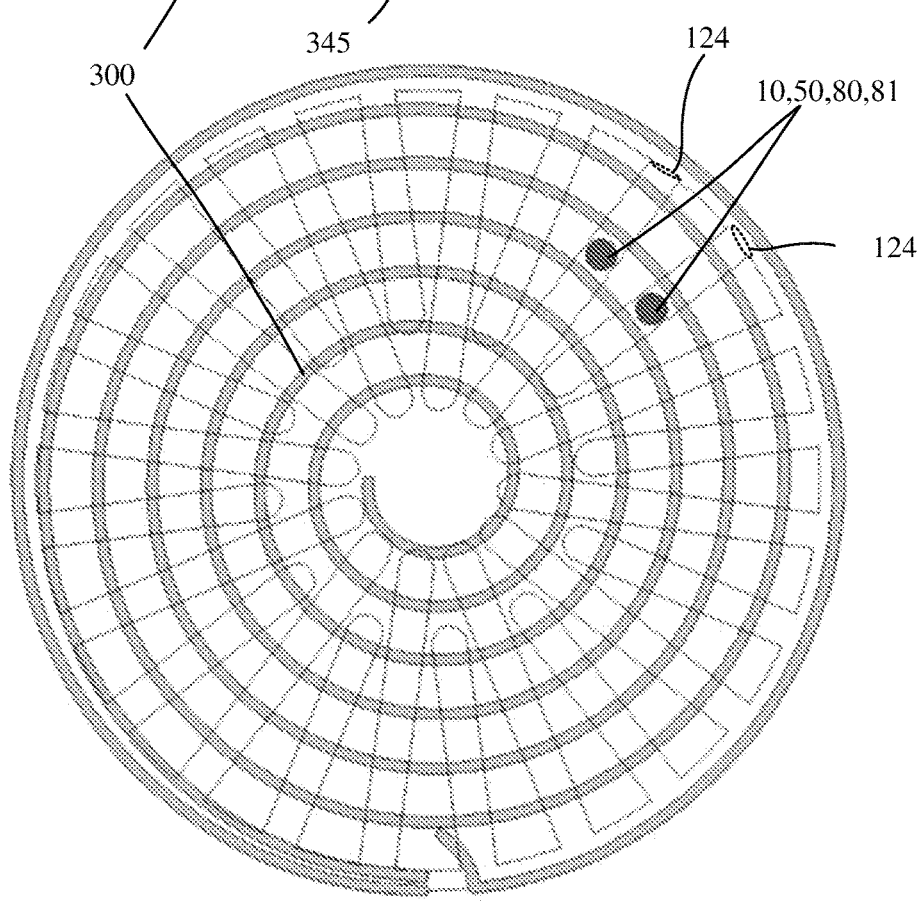
Figure 8C:
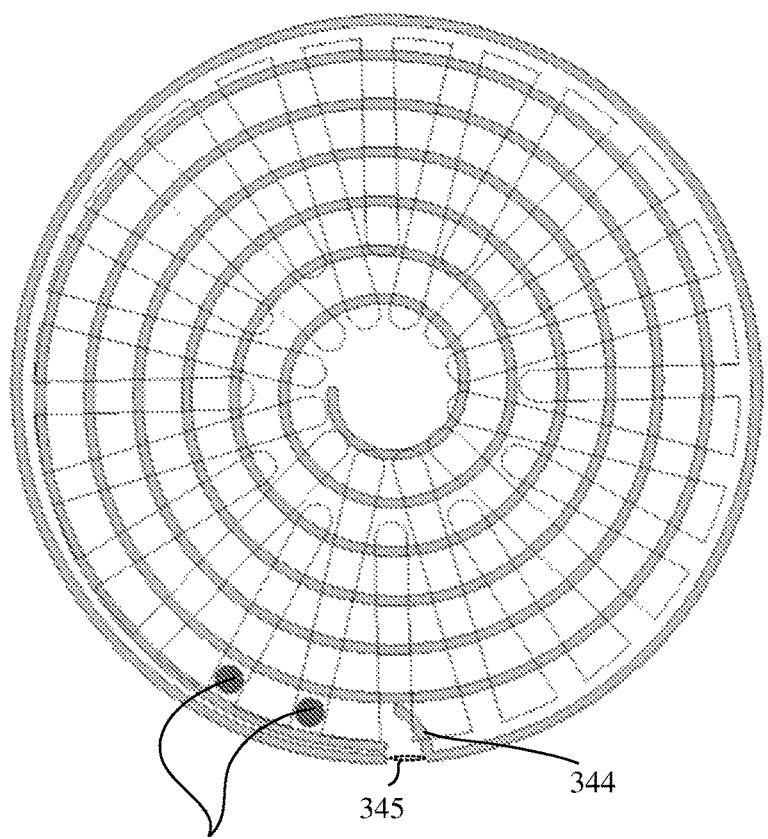
Figure 8D:
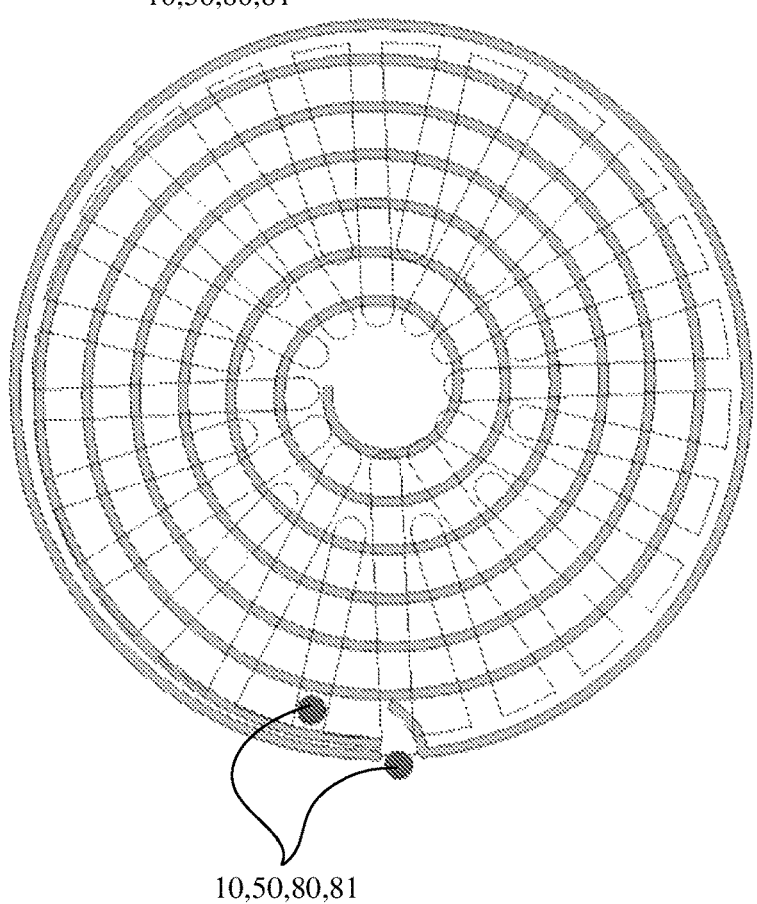
FIG. 8D is end-view cross-sectional diagram of one of the two initiation device components being dispensed from the exit aperture of the spiral guide structure in FIGS. 8A to 8C.

The magazine 100,101,100X provides a method of carrying, dispensing, and reading including:

receiving a plurality of initiation device components 10,50 or initiation devices 81 into the magazine;

holding the plurality of initiation device components 10,50 or initiation devices 81, e.g., as illustrated in FIG. 8A;

displacing the plurality of initiation device components 10,50 or initiation devices 81—along the spiral travel channel/path 342 and along respective the slots 120, e.g., as illustrated in FIGS. 8A to 8C—toward the outlet of the magazine;

dispensing from the magazine 100,101,100X one of the plurality of initiation device components 10,50 or initiation devices 81, e.g., as illustrated in FIG. 8D; and reading non-contact ID (e.g., the RFID tags 15, 25, 55, 85) of the initiation devices 81 or initiation device components 10,50 while in the magazine 100,101,100X and/or while being dispensed from the magazine 100,101.

The assembly apparatus 800 provides a method of assembly, including:

receiving the one of the first initiation device components 10;

receiving the one of the second initiation device components 50 in the corresponding manner to the receiving of the first initiation device component 10; and assembling the dispensed first initiation device component 10 and the correspondingly dispensed second initiation device component 50 together to form the structurally complete, unified initiation device 80.

The vehicle 7000 provides a method of deployment, including loading the unified initiation device 80 into the borehole 5a.

The system 2000 provides a method of tracking, including: generating an alert if the read non-contact ID corresponds to a previously encoded non-contact ID.

Interpretation

The above description details aspects of particular systems, apparatuses, and devices in accordance with particular non-limiting representative embodiments of the present disclosure. It will be readily understood by a person having ordinary skill in the relevant art that modifications can be made to one or more aspects or portions of these and related embodiments without departing from the scope of the present disclosure.

The invention claimed is:

1. A system for storing, dispensing and tracking initiation devices or initiation devices components configurable for initiating explosive material compositions in association with commercial blasting operations, the system including:
   a magazine configured for holding and dispensing initiation devices or initiation device components having respective non-contact readable identification (ID) codes, wherein the magazine includes one or more initiation device tracking units configured for reading the non-contact ID codes of the initiation devices or initiation device components for tracking the initiation devices or the initiation device components,
      wherein the system is configured to generate an alert and/or a disable/reset command if the initiation device tracking units read a non-contact ID code that is in a set of stored ID codes that are flagged as not belonging in the magazine and/or not in a set of stored ID codes that are recorded as being ready for dispensing
   wherein the system includes a data communication unit coupled to the initiation device tracking units by which non-contract ID codes read by the initiation device tracking units can be communicated to an external or remote destination, network/network address, computer system, or electronic/computing device, or a remote server system, that is separate or distinct from the magazine.

2. The system of claim 1, wherein each of the initiation device components includes an initiation device head unit that carries a head unit ID code, an initiation element that carries an initiation element ID code, and an initiation device booster unit that carries a booster unit ID code; or wherein the initiation devices comprise one-piece primer units that each carry a primer unit ID code.

3. The system of claim 1, wherein the non-contact ID codes uniquely identify the initiation devices or initiation device components.

4. The system of claim 1, wherein the non-contact ID codes are in the form of RFID tags, and the initiation device tracking units include RFID scanner/reader devices.

5. The system of claim 1, wherein the initiation device components are wireless initiation device components and the magazine includes the wireless initiation device components, or the initiation devices are wireless initiation devices and the magazine includes the wireless initiation devices.

6. The system of claim 1, including one or more antennas configured to wirelessly communicate commands to the initiation devices or initiation device components stored in the magazine.

7. The system of claim 6 wherein the one or more antennas include an antenna remote from the magazine or an antenna disposed adjacent to or carried by the magazine.

8. The system of claim 1,
   wherein the magazine includes at least one carrier for carrying the initiation devices or initiation device components and for guiding the initiation devices or initiation device components during the dispensing, wherein the carrier includes at least one slot, wherein the slot is configured to carry the initiation devices or initiation device components across a first portion of each initiation device's length or initiation device component's length, and
   wherein the magazine includes one or more spiral guide structures for carrying the initiation devices or initiation device components across a second portion of each initiation device's length or initiation device component's length and for guiding the initiation devices or initiation device components during the dispensing.

9. The system of claim 8, wherein the at least one slot includes an inner or bottom surface closer to a centroid or center point of the carrier, and wherein each slot includes an exit opening at an outer edge of the carrier.

10. The system of claim 8, wherein the spiral guide structures are disposed relative to the carrier for establishing or providing spiral travel channels/paths for the initiation devices or initiation device components held by the slots, wherein the spiral travel channels/paths are configured for carrying the initiation devices or initiation device components such that rotation of the carrier relative to the spiral guide structures in a dispensing direction displaces the initiation devices or initiation device components along the spiral travel channels/paths and along the slots toward an outlet of the magazine.

11. The system of claim 8, including one or more of:
   a lid structure for opening to allow loading of the initiation devices or initiation device components into the magazine;
   a case structure for at least partially encasing carrier and spiral guide structures of the magazine, including an explosives box enclosure for enclosing the case structure; and a drive shaft and/or a drive mechanism for driving the magazine to dispense the initiation devices or initiation device components in a progressive and/or indexed manner.

12. The system of claim 1 including a vehicle with the magazine securely mountable or mounted to the vehicle for transport to a location near or at a borehole.

13. A method for storing, dispensing and tracking initiation devices or initiation device components configurable for initiating explosive material compositions in association with commercial blasting operations, the method including:
holding initiation devices or initiation device components having respective noncontact readable identification (ID) codes in a magazine;
dispensing the initiation devices or initiation device components from the magazine;
reading the non-contact ID codes while the initiation devices or initiation device components are stored in and/or being dispensed from the magazine, and
generating an alert and/or a disable/reset command if the initiation device tracking units read a non-contact ID code that is in a set of stored ID codes that are flagged as not belonging in the magazine and/or not in a set of stored ID codes that are recorded as being ready for dispensing.

14. The system of claim 1, wherein the magazine includes:
an outlet including an exit opening/aperture; and
an exit guide segment or section configured to direct or guide the initiation devices or initiation device components to the outlet.

15. The system of claim 1, wherein the set of stored ID codes that are flagged as not belonging in the magazine indicates that corresponding particular initiation devices or initiation device components: (a) should not currently reside in the magazine; and/or (b) have been previously dispensed from one or the magazine but have subsequently been reloaded into the magazine including wherein a particular initiation device or initiation device component has been encoded by an encoder.

16. The system of claim 15, wherein the stored ID codes are flagged in a database.

17. The system of claim 15, wherein the particular initiation devices or initiation device components are identified by serial numbers.

18. The system of claim 1, wherein the disable/reset command includes a unique initiation device ID corresponding to a particular one of the initiation devices or initiation device components.

19. The method of claim 13, including:
displacing the initiation devices or initiation device components toward an outlet of the magazine; and
dispensing from the magazine one of the initiation devices or initiation device components.

20. The method of claim 19, wherein the displacing the initiation devices or initiation device components toward the outlet of the magazine is along spiral travel channels/paths and along slots of the magazine toward the outlet of the magazine.

21. The method of claim 19, including loading the initiation devices or initiation device components into a borehole.

22. A system for storing, dispensing and tracking initiation devices or initiation devices components configurable for initiating explosive material compositions in association with commercial blasting operations, the system including:
a magazine configured for holding and dispensing initiation devices or initiation device components having respective non-contact readable identification (ID) codes, wherein the magazine includes one or more initiation device tracking units configured for reading the non-contact ID codes of the initiation devices or initiation device components for tracking the initiation devices or the initiation device components,
wherein the system is configured to generate an alert and/or a disable/reset command if the initiation device tracking units read a non-contact ID code that is in a set of stored ID codes that are flagged as not belonging in the magazine and/or not in a set of stored ID codes that are recorded as being ready for dispensing,
wherein the system includes one or more antennas configured to wirelessly communicate commands to the initiation devices or initiation device components stored in the magazine.

* * * * *